US012717136B2

(12) United States Patent
Fang et al.

(10) Patent No.: US 12,717,136 B2
(45) Date of Patent: Aug. 25, 2026

(54) HEAD UP DISPLAY SYSTEM AND CONTROL METHOD THEREOF, AND VEHICLE

(71) Applicant: FUTURUS TECHNOLOGY CO., LTD., Beijing (CN)

(72) Inventors: Tao Fang, Beijing (CN); Junfeng Xu, Beijing (CN); Huijun Wu, Beijing (CN)

(73) Assignee: FUTURUS TECHNOLOGY CO., LTD., Beijing (CN)

( * ) Notice: Subject to any disclaimer, the term of this patent is extended or adjusted under 35 U.S.C. 154(b) by 1080 days.

(21) Appl. No.: 17/792,014

(22) PCT Filed: Jan. 11, 2021

(86) PCT No.: PCT/CN2021/071090

§ 371 (c)(1), (2) Date: Jul. 11, 2022

(87) PCT Pub. No.: WO2021/139812

PCT Pub. Date: Jul. 15, 2021

(65) Prior Publication Data

US 2023/0046484 A1 Feb. 16, 2023

(30) Foreign Application Priority Data

Jan. 10, 2020 (CN) ......................... 202010026623.1

(51) Int. Cl.

*G02B 27/01* (2006.01)
*B60K 35/22* (2024.01)
(Continued)

(52) U.S. Cl.

CPC .......... *G02B 27/0101* (2013.01); *B60K 35/22* (2024.01); *B60K 35/23* (2024.01);
(Continued)

(58) Field of Classification Search

CPC ..... G02B 27/00–648; G02B 2027/0105–0198; B60K 35/00–20
See application file for complete search history.

(56) References Cited

U.S. PATENT DOCUMENTS

2018/0231772 A1 8/2018 Han et al.
2019/0293934 A1 9/2019 Asai
(Continued)

FOREIGN PATENT DOCUMENTS

CN 101872070 A 10/2010
CN 107045255 A 8/2017
(Continued)

*Primary Examiner* — Christopher A Lamb, II
(74) *Attorney, Agent, or Firm* — Dilworth & Barrese, LLP.; Michael J. Musella, Esq.

(57) ABSTRACT

A head up display system, a control method thereof and a vehicle are provided. The head up display system includes an imaging device group, a concave reflective element, a directional imaging device and a processor, the imaging device group includes at least one single-layer imaging device; the directional imaging device includes a light source device, a direction control element, a diffusing element and a light modulating layer; the processor is respectively connected with the directional imaging device and the at least one single-layer imaging device in the imaging device group.

18 Claims, 18 Drawing Sheets

(51) Int. Cl.

| | |
|---|---|
| ***B60K 35/23*** | (2024.01) |
| ***B60K 35/26*** | (2024.01) |
| ***B60K 35/28*** | (2024.01) |
| ***B60K 35/29*** | (2024.01) |
| ***B60K 35/60*** | (2024.01) |
| ***B60K 35/81*** | (2024.01) |

(52) U.S. Cl.

CPC ............ *B60K 35/265* (2024.01); *B60K 35/28* (2024.01); *B60K 35/60* (2024.01); *B60K 35/81* (2024.01); *B60K 35/29* (2024.01); *B60K 2360/178* (2024.01); *B60K 2360/179* (2024.01); *B60K 2360/191* (2024.01); *B60K 2360/23* (2024.01); *G02B 2027/0112* (2013.01); *G02B 2027/013* (2013.01); *G02B 2027/0141* (2013.01)

(56) References Cited

U.S. PATENT DOCUMENTS

| | | | | |
|---|---|---|---|---|
| 2019/0317322 | A1* | 10/2019 | Hayakawa | G02B 27/0101 |
| 2019/0361234 | A1* | 11/2019 | Hayakawa | B60K 35/60 |
| 2020/0298704 | A1* | 9/2020 | Hirata | B60R 11/02 |
| 2020/0393675 | A1* | 12/2020 | Huang | G02B 27/0101 |

FOREIGN PATENT DOCUMENTS

| | | | |
|---|---|---|---|
| CN | 109477967 | A | 3/2019 |
| CN | 209381917 | U | 9/2019 |
| JP | 2018-136420 | A | 8/2018 |

* cited by examiner

HEAD UP DISPLAY SYSTEM AND CONTROL METHOD THEREOF, AND VEHICLE

This application claims priority of Chinese Patent Application No. 202010026623.1 filed on Jan. 10, 2020. For all purposes, the disclosure of the above Chinese Patent Application is hereby incorporated by reference in its entirety as part of this application.

TECHNICAL FIELD

Embodiments of the present disclosure relate to a head up display system, a control method thereof, and a vehicle.

BACKGROUND

A head up display (HUD) applied to a vehicle can project important driving information such as speed and navigation to a windshield in front of a driver, so that the driver can see important local information such as speed, navigation, etc. without looking down or turning his/her head as far as possible, which can improve driving safety factor, and also bring a better driving experience. Therefore, the HUD that uses automotive windshield for imaging is receiving more and more attention.

An augmented reality HUD (AR-HUD) can reasonably and vividly display some local information in a superimposing manner within a line-of-sight region of the driver, and can also be combined with actual traffic conditions, to further enhance the driver's perception of actual driving environment. Thus, the rise of AR-HUD has posed higher technical requirements for the HUD industry.

SUMMARY

At least one embodiment of the present disclosure provides a head up display system, the head up display system comprises an imaging device group, a concave reflective element, a directional imaging device and a processor, the imaging device group comprises at least one single-layer imaging device; the directional imaging device comprises a light source device, a direction control element, a diffusing element and a light modulating layer; the processor is respectively connected with the directional imaging device and the at least one single-layer imaging device in the imaging device group; the direction control element is configured to converge light emitted by the light source device; the diffusing element is configured to diffuse converged light that is emergent from the direction control element, so that the converged light forms a light beam for forming a light spot; and the light modulating layer is configured to modulate the light beam for forming the light spot, so that the light beam is formed into directional imaging light; the at least one single-layer imaging device is configured to emit imaging light incident to the concave reflective element; the concave reflective element is configured to reflect the imaging light; and the processor is configured to: determine to-be-displayed target information and a target imaging device, and control the target imaging device to display the to-be-displayed target information; wherein the target imaging device is one or more imaging devices selected from a group consisting of the directional imaging device and the at least one single-layer imaging device in the imaging device group.

At least one embodiment of the present disclosure further provides a head up display system, the head up display system comprises an imaging device group and a concave reflective element; the imaging device group comprises a plurality of single-layer imaging devices; each of the plurality of single-layer imaging devices is configured to emit imaging light incident to the concave reflective element; at least part of the plurality of single-layer imaging devices correspond to a same object distance or at least part of the plurality of single-layer imaging devices correspond to different object distances; and an object distance comprises a propagation path length of imaging light from a corresponding single-layer imaging device to the concave reflective element; the concave reflective element is configured to reflect the imaging light.

At least one embodiment of the present disclosure further provides a control method of a head up display system, the head up display system comprises an imaging device group and a directional imaging device; the imaging device group comprises at least one single-layer imaging device, and an imaging range of the directional imaging device is greater than an imaging range of the at least one single-layer imaging device; the control method comprises: determining to-be-displayed target information and a target imaging device, and controlling the target imaging device to display the target information; wherein the target imaging device is an imaging device selected from a group consisting of the directional imaging device and the at least one single-layer imaging device in the imaging device group.

For example, in some embodiments, the control method further comprises: determine a target position, in which the target position is a position of the reflective imaging part for displaying the target information; determining an imaging region comprising the target position, and taking the imaging device corresponding to the imaging region as the target imaging device; and control the target imaging device to display the target information at the target position. The imaging region is a region where the imaging light can be incident to the surface of the reflective imaging part. For example, the imaging region is a part of a magnified imaging region or a directional imaging region.

For example, in some embodiments, the control method further comprises: in a case that a projection position of an external object projected to the reflective imaging part is located within the magnified imaging region, taking the external object as the target object, and determining a target distance between a reference object and the target object; in which the magnified imaging region is a region where imaging light emitted by the imaging device group is capable of being incident to a surface of the reflective imaging part; taking the projection position or an edge of the projection position located within the magnified imaging region as the target position; and determining an image distance of each single-layer imaging device in the imaging device group, taking the image distance matching the target distance as the target image distance, and taking the single-layer imaging device corresponding to the target image distance as the target imaging device; in which the image distance is the distance between the virtual image of the single-layer imaging device formed by the concave reflecting element and the concave reflecting element; or in a case that a projection position of an external object projected to (mapped to) the reflective imaging part is located within the directional imaging region, taking the external object as the target object, in which the directional imaging region is a region where directional imaging light emitted by the directional imaging device is capable of being incident to the surface of the reflective imaging part; and taking the projection position or an edge of the projection position as the target position.

For example, in some embodiments, the head up display system further comprises an information collecting device; the information collecting device is configured to collect local information and surrounding information, and control method further comprises: acquiring the local information and the surrounding information, and generating target information according to the local information and the surrounding information.

For example, in some embodiments, the local information comprises local speed information; the surrounding information comprises a distance between a reference object and an external object; and the method further comprises: determining a safety distance according to the local speed information, and judging whether the distance between the reference object and the external object is greater than the safety distance; in a case that the distance between the reference object and the external object is greater than the safety distance, it is determined that the reference object is currently in a normal state, and corresponding first prompt information is taken as the target information, in which the first prompt information includes one or more selected from the group consisting of an empty set, a first prompt image, and a first prompt video; in a case that the distance between the reference object and the external object is not greater than the safety distance, determining that the reference object is currently in an early warning state, and taking corresponding first early warning information as the target information, in which the first early warning information comprises one or more selected from the group consisting of a first early warning image and a first early warning video.

For example, in some embodiments, the surrounding information comprises a distance between a reference object and an external object and a position of the external object; and generating the target information according to the local information and the surrounding information comprises: taking the distance between the reference object (the vehicle) and the external object and the position of the external object as the target information; or determining a projection position where the external object is projected to the reflective imaging part, taking the projection position or an edge of the projection position as the target position, and controlling the target imaging device to display target information at the target position.

For example, in some embodiments, the control method further comprises: in a case that the external object is a key object, determining that the reference object is currently in an early warning state, and taking corresponding second early warning information as the target information, in which the second early warning information comprises one or more selected from the group consisting of a second early warning image and a second early warning video. In a case that the distance between the reference object and the external object is less than a pre-set distance value, and the external object is a pedestrian, an animal, or a non-motor vehicle, the external object is regarded as the key object. Or, in a case that the external object moves toward a current driving line, and the external object is a pedestrian, an animal or a non-motor vehicle, the external object is regarded as the key object. Or, in a case that the external object is located in the current driving line, and the external object is a pedestrian, an animal, or a non-motor vehicle, the external object is regarded as the key object. Or, in a case that the vehicle is currently located in an object-intensive region, and the external objects are pedestrians, animals or non-motor vehicles, the external objects are regarded as key objects; the object-intensive region includes one or more selected from the group consisting of a school, a hospital, a parking lot, and an urban district. Or, the local information includes the driver's line-of-sight azimuth information; in a case that the line-of-sight azimuth information does not match a current position of the external object, and the external object is a pedestrian, an animal or a non-motor vehicle, the external object is taken as the key object.

For example, in some embodiments, the safety distance comprises a front safety distance; and the method further comprises: in a case that the external object is located in front of the reference object, the distance between the reference object and the external object is not greater than the front safety distance, and a difference between the safety distance and the distance between the reference object and the external object is greater than a pre-set distance difference and/or a duration in the early warning state exceeds a pre-set duration, generating a brake signal or a deceleration signal, and outputting the brake signal or the deceleration signal.

For example, in some embodiments, the surrounding information comprises lane position information; the local information comprises vehicle position information; and generating the target information according to the local information and the surrounding information comprises: according to the lane position information and the vehicle position information, determining a deviation parameter that a vehicle deviates from a current driving lane, and judging whether the deviation parameter is greater than a corresponding deviation threshold; in which the deviation parameter comprises a deviation angle and/or a deviation distance; in a case that the deviation parameter is greater than the corresponding deviation threshold, determining that the reference object is currently in an early warning state, and taking corresponding third early warning information as the target information; in which the third early warning information comprises one or more selected from the group consisting of a third early warning image, a third early warning video, and a priority driving lane; in a case that the deviation parameter is not greater than the corresponding deviation threshold, determining that the reference object is currently in a normal state, and taking the corresponding third prompt information as the target information, in which the third prompt information includes one or more selected from the group consisting of an empty set, a third prompt image, a third prompt image, a third prompt video, and a priority driving lane.

For example, in some embodiments, the local information further comprises vehicle state information; the vehicle state information comprises one or more selected from the group consisting of a vehicle speed, a vehicle acceleration, and a turn signal state; and generating the target information according to the local information and the surrounding information further comprises: in a case that the deviation parameter is greater than the corresponding deviation threshold and an early warning condition is satisfied, determining that the reference object is currently in an early warning state; in which the early warning condition comprises one or more selected from the group consisting of items that: the vehicle speed being greater than a first pre-set speed value, the vehicle acceleration being not greater than zero, a turn signal on an opposite side to a direction corresponding to the deviation angle of the vehicle being not in an ON state, the current state being an unchangeable lane state, and a duration of lane deviation being greater than a pre-set first deviation duration threshold.

For example, in some embodiments, the concave reflective element is not in an optical path of the light emitted from the light source device to the reflective imaging part.

For example, in some embodiments, the direction control element comprises at least one transparent part, the transparent part comprises a light incident surface and a light exit surface, the light source device comprises a plurality of light sources, and light emitted by a light source corresponding to the transparent part enters the transparent part from the light incident surface and exits from the light exit surface, the transparent part is configured to make a divergence angle of the light emitted from the light exit surface smaller than a divergence angle of the light incident to the light incident surface; the light incident surface comprises a first light incident sub-surface with a protrusion direction towards the light source, and/or the light exit surface comprises a first light exit sub-surface with a protrusion direction away from the light source; the light incident surface further comprises a second light incident sub-surface connected with the first light incident sub-surface, and the transparent part further comprises a side surface connecting the second light incident sub-surface with the light exit surface, part of the light emitted by the light source enters the transparent part from the second light incident sub-surface, then is reflected by the side surface, and exits from the light exit surface; and/or the light exit surface further comprises a second light exit sub-surface connected with the first light exit sub-surface, and the transparent part further comprises a side surface connecting the second light exit sub-surface with the light incident surface, part of the light emitted by the light source enters the transparent part, then is reflected by the side surface, and is emitted from the second light exit sub-surface; and/or, the at least one transparent part is in a transparent part layer, the plurality of light sources are in a light source layer, and a region between the light source layer and the transparent part layer is a gas medium layer; and/or, the direction control element further comprises a plurality of light converging elements, light emitted by a light source corresponding to the light converging element passes through the transparent part after passing through the light converging element, the at least one transparent part is in a transparent part layer, the plurality of light converging elements are in a light converging layer, and a region between the light converging element layer and the transparent part layer is a gas medium layer.

For example, in some embodiments, the method further comprises: determining a priority driving lane of the vehicle according to the lane position information and the vehicle position information, taking the priority driving lane as the target object; determining a projection position to project the target object on the reflective imaging part, taking the projection position or an edge of the projection position as the target position, and controlling the target imaging device to display pre-set target information at the target position; or determining the priority driving lane of the vehicle according to the vehicle position information and the lane position information, taking boundary lines on both sides of the priority driving lane as the target object, taking a graphic whose shape matches the boundary lines as target information; determining a projection position to project the target object on the reflective imaging part, taking the projection position as the target position, and controlling the target imaging device to display target information in a pre-set color at the target position.

For example, in some embodiments, the method further comprises: in a case that the deviation parameter is greater than the corresponding deviation threshold, and a difference between the deviation parameter and the deviation threshold is greater than a pre-set deviation difference value and/or a duration in the deviation state exceeds a pre-set safety deviation duration, generating a brake signal or a deceleration signal, and outputting the brake signal or the deceleration signal.

For example, in some embodiments, the surrounding information comprises front information, and the front information comprises a vehicle speed of a front vehicle and/or a current distance to a front vehicle; the method further comprises: taking a projection position where a target region of the front vehicle is projected to the reflective imaging part as the target position, taking the front information as the target information, and controlling the target imaging device to display the target information at the target position; in which the target region of the front vehicle is a blank region between rear wheels of the front vehicle or a region where a trunk is located.

For example, in some embodiments, the method further comprises: in a case that the reference object is currently in an early warning state, controlling the target imaging device to display the target information in a normal mode or a first highlighting display mode; in which the first highlighting display mode comprises one or more selected from the group consisting of dynamic display (e.g. scrolling display, skipping display, or jumping display), highlighting display, and display in a first color; and in a case that the reference object is currently in a normal state, controlling the target imaging device to display the target information in a normal mode or a second highlighting display mode; in which the second highlighting display mode comprises display in a second color.

For example, in some embodiments, the head up display system further comprises a sounding device and/or a vibrating device, the control method further comprises: in a case that an early warning state is generated, sending a prompt voice to the sounding device, and controlling the sounding device to play the prompt voice; and/or sending a vibration signal to the vibrating device to controlling the vibrating device to vibrate.

For example, in some embodiments, the surrounding information comprises road abnormality information; the road abnormality information comprises one or more selected from the group consisting of obstacle position, uneven section position, dangerous section position, maintenance section position, accident section position, and temporarily-inspected section position; and the control method further comprises: taking the road abnormality information as the target information; or determining an abnormal position according to the road abnormality information, determining a projection position where the abnormal position is projected to the reflective imaging part, taking the projection position or an edge of the projection position as the target position, and controlling the target imaging device to display the target information corresponding to the road abnormality information at the target position.

For example, in some embodiments, the surrounding information comprises current visibility; and the control method further comprises: in a case that the current visibility is less than a pre-set visibility threshold, acquiring position information of an external object collected by the information collecting device; and taking the position information of the external object as target information; or determining a projection position where the external object is projected to the reflective imaging part, taking the projection position or an edge of the projection position as the target position, and controlling the target imaging device to display pre-set target information at the target position.

For example, in some embodiments, the control method further comprises: generating push information according to the target information, and sending the push information to a server or to another device within a pre-set distance, such as a vehicle, a mobile phone, and the like.

At least one embodiment of the present disclosure further provides a vehicle, the vehicle comprises any one of the above head up display systems.

BRIEF DESCRIPTION OF THE DRAWINGS

In order to demonstrate clearly technical solutions of the embodiments of the present disclosure, the accompanying drawings in relevant embodiments of the present disclosure will be introduced briefly. It is apparent that the drawings only relate to some embodiments of the present disclosure and not intended to limit the present disclosure.

DETAILED DESCRIPTION

Figure 1A:
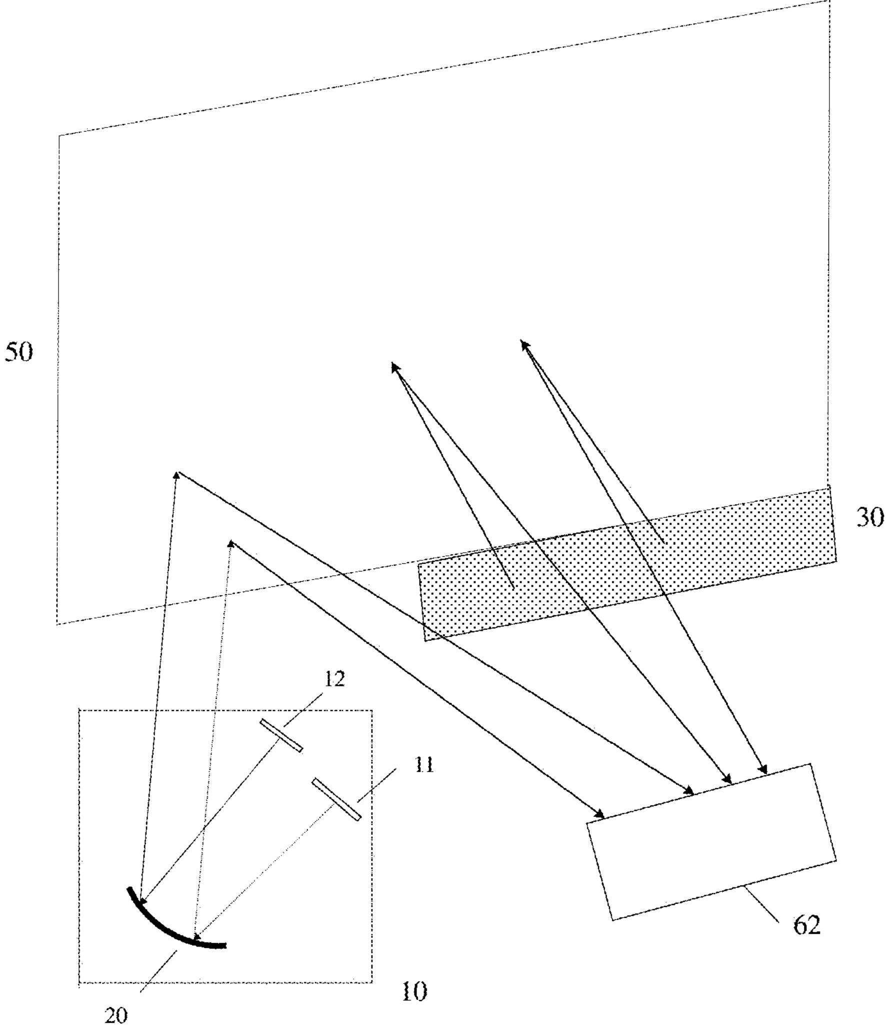
FIG. 1A shows a schematic diagram of a head up display system provided by at least one embodiment of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. It is apparent that the described embodiments are just a part but not all of the embodiments of the present disclosure. Based on the described embodiments herein, those skilled in the art may obtain other embodiments, without any creative work, which shall be within the scope of the disclosure.

Unless otherwise defined, all the technical and scientific terms used herein have the same meanings as commonly understood by one of ordinary skill in the art to which the present disclosure belongs. The terms, such as "first", "second" or the like, which are used in the description and the claims of the present disclosure, are not intended to indicate any sequence, amount or importance, but for distinguishing various components. The terms, such as "comprise/comprising", "include/including" or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may comprise an electrical connection/coupling, directly or indirectly. The terms, "on", "under", "left", "right" or the like are only used to indicate relative position relationship, and when the position of the object which is described is changed, the relative position relationship may be changed accordingly.

Some embodiments of the present disclosure provide a head up display system, the head up display system includes an imaging device group and a concave reflective element; the imaging device group comprises a plurality of single-layer imaging devices. Each of the plurality of single-layer imaging devices is configured to emit imaging light incident to the concave reflective element; at least part of the plurality of single-layer imaging devices correspond to a same object distance or at least part of the plurality of single-layer imaging devices correspond to different object distances; and the object distance comprises a propagation path length of the imaging light from the single-layer imaging device corresponding to the object distance to the concave reflective element; the concave reflective element is configured to reflect the imaging light.

Some embodiments of the present disclosure further provide a control method of a head up display system, the head up display system comprises an imaging device group and a directional imaging device; the imaging device group comprises at least one single-layer imaging device; the control method includes: determining to-be-displayed target information and a target imaging device, and controlling the target imaging device to display the target information; in which the target imaging device is an imaging device selected from a group consisting of the directional imaging device and the at least one single-layer imaging device in the imaging device group.

Some embodiments of the present disclosure provide a head up display system capable of displaying multiple images; the head up display system can form multi-layered images in positions having different distances from a local position, so as to implement multi-layered imaging; and the head up display system can also implement large-scale imaging, for example, full-window imaging, so that information can be displayed in a large scale through the vehicle, and therefore more content can be displayed.

In some embodiments of the present disclosure, as shown in FIG. 1A to FIG. 2B, the head up display system includes: an imaging device group, a concave reflective element 20, a directional imaging device 30 and a processor 100; the imaging device group includes at least one single-layer imaging device. In some embodiments, as shown in FIG. 1A, the imaging device group includes a first single-layer imaging device 11 and a second single-layer imaging device 12, the imaging device group may further include more single-layer imaging devices, for example, include a third single-layer imaging device 13, etc. Each single-layer imaging device is configured to emit imaging light incident to the concave reflective element 20, for forming a single-layer image in a predetermined position.

For example, the imaging device group may include a plurality of single-layer imaging devices (i.e., at least two single-layer imaging devices); at least part of the plurality of single-layer imaging devices correspond to the same object distance or at least part of the plurality of single-layer imaging devices correspond to different object distances; and an object distance is a propagation path length of imaging light from a corresponding single-layer imaging device to the concave reflective element, or a distance from the single-layer imaging device to the concave reflective element. As a result, multi-layered imaging can be implemented.

Figure 19A:
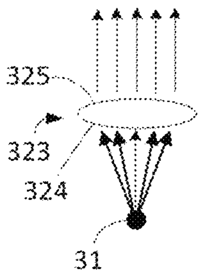
FIG. 19A shows a first structural schematic diagram of a direction control element in a head up display system provided by at least one embodiment of the present disclosure.

The processor is respectively connected with the directional imaging device 30 and the single-layer imaging device in the imaging device group, for example, communicatively connected in a wired or wireless manner, so as to implement a control function on the directional imaging device 30 and the single-layer imaging device in the imaging device group, as shown in FIG. 19A. The above-described "being respectively connected" includes being connected individually and being connected in series.

For example, the processor may be used in an autonomous vehicle and/or a manually driven vehicle. For example, in some examples, the processor may include a plurality of sub-processors; and the plurality of processors are respectively connected with the directional imaging device 30 and the single-layer imaging device in the imaging device group. For example, the head up display system may further include a processor other than the above-described processors, or the processor may also include a sub-processor other than the sub-processors connected with the directional imaging device 30 and the single-layer imaging device in the imaging device group.

In some embodiments of the present disclosure, large-scale imaging can be implemented by using the directional imaging device 30; multi-layered (e.g., two-layered) imaging can be implemented by using one single-layer imaging device and the directional imaging device 30; in a case that the imaging device group includes a plurality of single-layer imaging devices, at least two-layered imaging can be implemented by using the plurality of single-layer imaging devices. For example, during use, the concave reflective element 20 and the directional imaging device 30 may be arranged on a same side of the reflective imaging part 50, for example, the reflective imaging part 50 may be a windshield of a vehicle (e.g., including a windshield made of a glass material), or a reflective film on an inner side of the windshield, etc., the reflective film is capable of reflecting imaging light emitted by the head up display system, without affecting the driver's observation of things or scenes outside the vehicle through the reflective film; accordingly, the concave reflective element 20 and the directional imaging device 30 may be located in the vehicle, for example, located on an inner side of the reflective imaging part 50. For example, the concave reflective element 20 and the directional imaging device 30 may be arranged below the reflective imaging part 50, for example, at an instrument panel (IP) stage of an automobile.

Figure 2A:
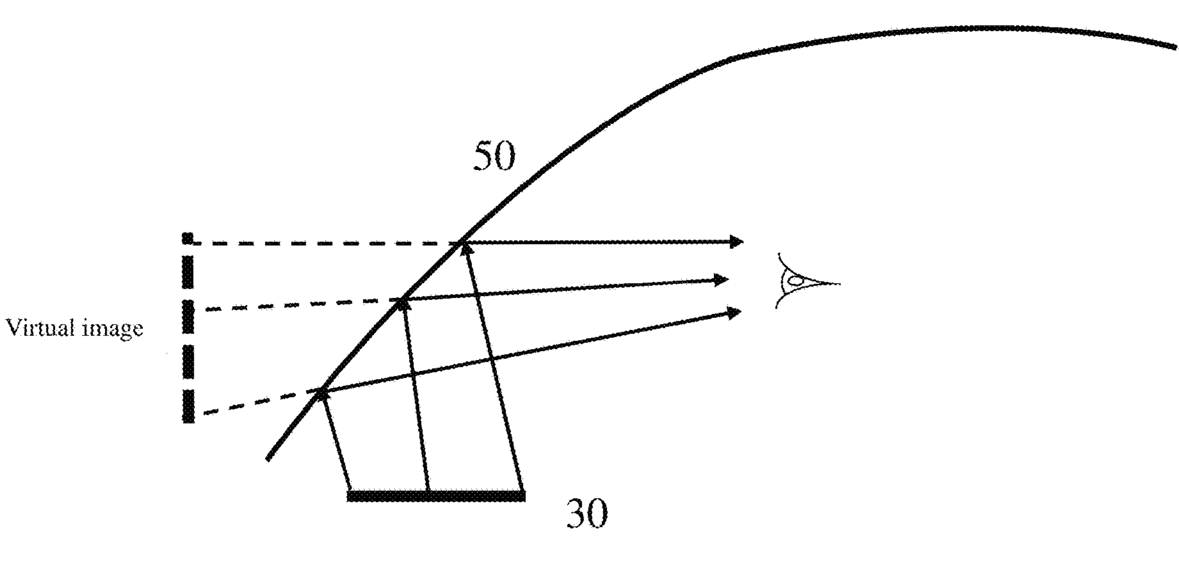
FIG. 2A shows a schematic diagram of imaging principle of a directional imaging device in a head up display system provided by at least one embodiment of the present disclosure.
Figure 2B:
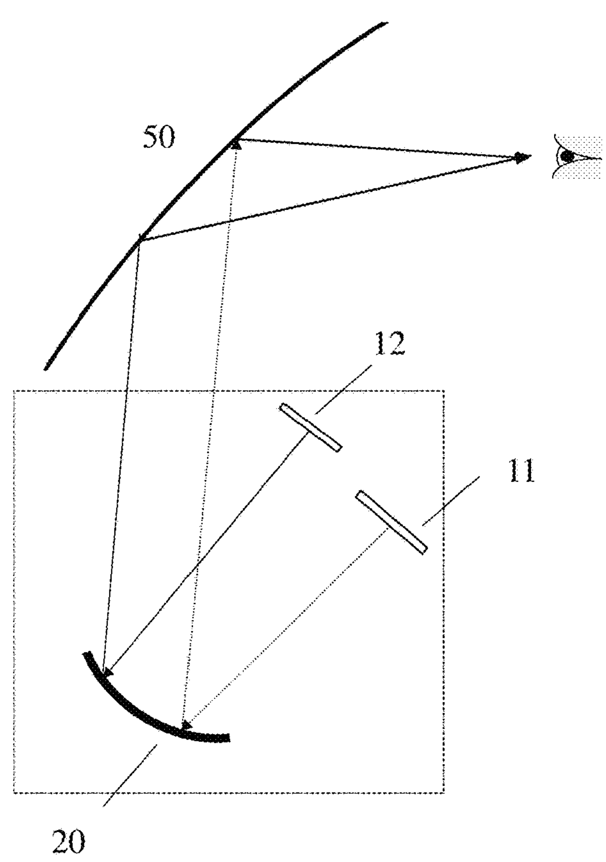
FIG. 2B shows a schematic diagram of imaging principle of an imaging device group in a head up display system provided by at least one embodiment of the present disclosure.

In some embodiments of the present disclosure, the single-layer imaging device is configured to emit imaging light incident to the concave reflective element 20; and object distances corresponding to different single-layer imaging devices are different from each other; for example, an object distance may be a propagation path length of imaging light from a corresponding single-layer imaging device to the concave reflective element 20, or a distance from the single-layer imaging device to the concave reflective element 20; the concave reflective element 20 is configured to reflect the imaging light to the reflective imaging part 50, so that the reflective imaging part 50 is capable of reflecting the imaging light to a predetermined range, for example, an eyebox range or eyebox ranges, so that the driver can see a virtual image of the single-layer imaging device formed by the reflective imaging part 50 within the eyebox range or eyebox ranges, as shown in FIG. 2B.

In some embodiments of the present disclosure, the "eyebox range or eyebox ranges" refers to a range within which a user's eyes can see an image formed by the head up display system; in addition, the "eyebox range or eyebox ranges" has a certain size to allow the user's eyes to move within the range and see the image as well.

Referring to FIG. 1A, the first single-layer imaging device 11 may emit first imaging light incident to the concave reflective element 20; the second single-layer imaging device 12 may emit second imaging light incident to the concave reflective element 20; and a first object distance corresponding to the first single-layer imaging device 11 is different from a second object distance corresponding to the second single-layer imaging device 12. The first object distance is a propagation path length of the first imaging light from the first single-layer imaging device 11 to the concave reflective element 20 or a distance from the first single-layer imaging device 11 to the concave reflective element 20; and the second object distance is a propagation path length of the second imaging light from the second single-layer imaging device 12 to the concave reflective element 20 or a distance from the second single-layer imaging device 12 to the concave reflective element 20. For example, the first single-layer imaging device 11 and the second single-layer imaging device 12 can implement two-layered imaging.

For example, the single-layer imaging device in the imaging device group may be a display, for example, an organic light emitting diode display or a liquid crystal display, etc.; in other embodiments, the single-layer imaging device in the imaging device group may also be a projector. The form of the single-layer imaging device in the imaging device group is not specifically limited in the embodiments of the present disclosure.

In some embodiments of the present disclosure, "single-layer" in the single-layer imaging device refers to that the single-layer imaging device can form a single image having an image distance in the head up display device.

Figure 3:
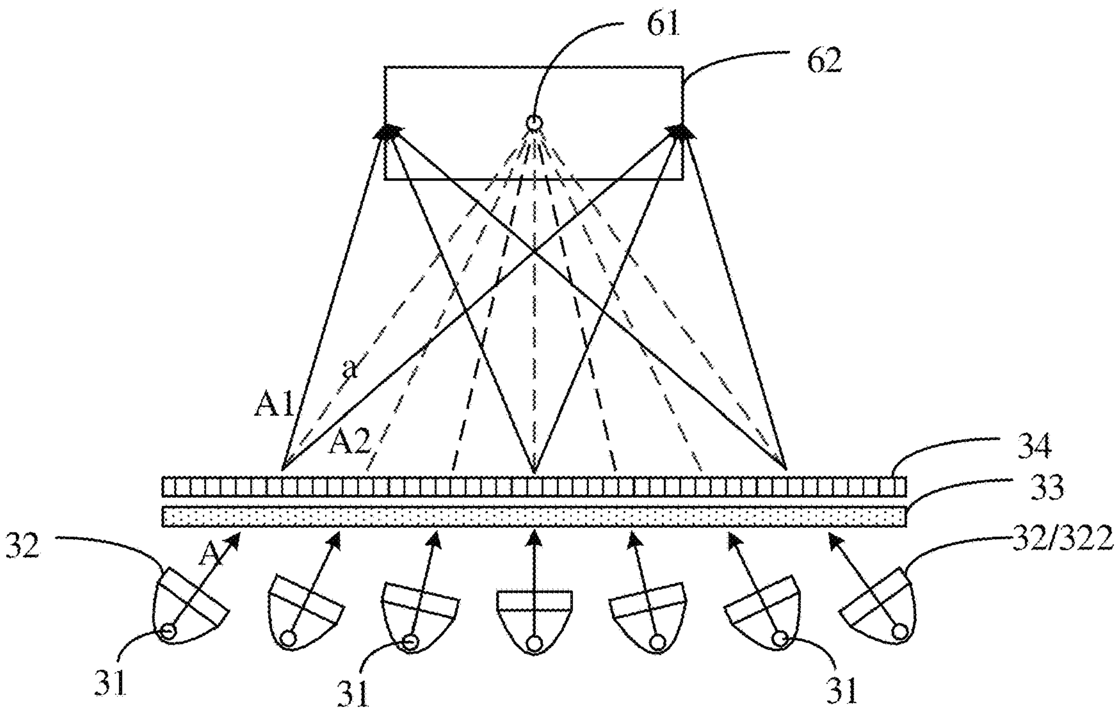
FIG. 3 shows a first structural schematic diagram of imaging by a directional imaging device in a head up display system provided by at least one embodiment of the present disclosure.

Referring to FIG. 2A and FIG. 3, the directional imaging device 30 is configured to emit directional imaging light incident to the reflective imaging part 50, so that the reflective imaging part 50 is capable of reflecting the directional imaging light to a predetermined range, for example, an eyebox range or eyebox ranges 62. In some embodiments, the directional imaging device 30 includes a light source device, a direction control element 32, a diffusing element 33 and a light modulating layer 34. For example, the light source device may be an electroluminescent element such as a light emitting diode (LED), and the number of the light source device may be one or more. For example, the light modulating layer 34 includes a liquid crystal layer (e.g., a liquid crystal display panel) or an electrowetting display layer; and the modulating layer can convert light passing therethrough into light (e.g., imaging light) including image information.

The direction control element 32 is configured to converge light emitted by the light source device, for example, to a pre-set region 61; the pre-set region 61 is a pre-set range, for example, a position or a range within the eyebox range or eyebox ranges 62; the diffusing element 33 and the light modulating layer 34 may be arranged on a same side of the direction control element 32; and the diffusing element 33 and the light modulating layer 34 are located on a light emitting side of the direction control element 32, so that light emitted by the direction control element 32 can be processed accordingly. The diffusing element 33 is configured to diffuse the converged light emergent from the direction control element 32, so that the converged light forms a light beam for forming a light spot; the light modulating layer 34 is configured to modulate the light beam for forming the light spot, so that the light beam is formed into directional imaging light. For example, the light modulating layer 34 can block or transmit light, and emit directional imaging light towards the reflective imaging part 50 during transmission, so that the reflective imaging part 50 is capable of reflecting the directional imaging light to a pre-set range, for example, within the eyebox range or eyebox ranges 62. For example, the diffusing element may also be referred to as a dispersing element; the dispersing element may disperse a light beam passing through the dispersing element without changing an optical axis of the light beam (e.g., a main direction of light beam propagation).

Figure 4A:
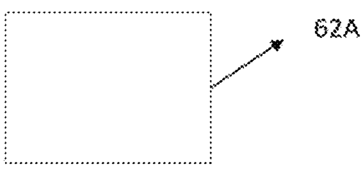
FIG. 4A shows a first schematic diagram of a pre-set range in a head up display system provided by at least one embodiment of the present disclosure.

For example, in some embodiments, as shown in FIG. 4A, the pre-set range 61A is the eyebox range 62, that is, the eyebox range 62 is the same range as the pre-set range 62A. The directional imaging light can be reflected by the reflective imaging part to the pre-set range 62A, and the imaging light can also be reflected by the reflective imaging part to the pre-set range 61A.

Figure 4B:
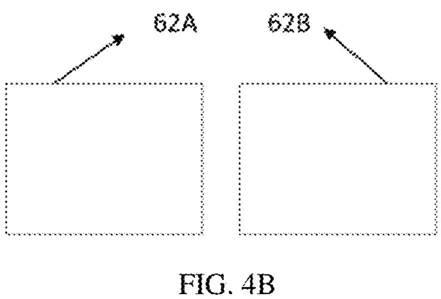
FIG. 4B shows a second schematic diagram of a pre-set range in a head up display system provided by at least one embodiment of the present disclosure.

For example, in some embodiments, as shown in FIG. 4B, the pre-set range is 61A, and the range outside the pre-set range 62A is the range 62B. The directional imaging light is reflected by the reflective imaging part to the pre-set range 62A, and the imaging light is reflected by the reflective imaging part to the range 62B outside the pre-set range 61A.

For example, the light modulating layer 34 in the embodiments of the present disclosure may be made of liquid crystals; and by controlling alignment of the liquid crystals, light can be blocked or transmitted, and a proportion of the transmitted light can be adjusted, so that brightness of the light can be adjusted, and/or an image is formed at the light modulating layer 34. Thus, the liquid crystal layer has a light modulation function, that is, can form an image. In some embodiments of the present disclosure, the diffusing element 33 and the light modulating layer 34 may be located on a light exit side of the direction control element 32, the diffusing element 33 may be arranged on a light incidence side of the light modulating layer 34, or may also be arranged on a light exit side of the light modulating layer 34; for example, in a case that the diffusing element 33 is arranged on the light exit side of the light modulating layer 34, the diffusing element 33 needs to be closely fitted to the light modulating layer 34 (e.g., directly fitted or fitted by bonding with optical glue, etc.), so that the light modulating layer 34 displays more clearly. In FIG. 3, it is described by taking the diffusing element 33 being arranged on a lower side of the light modulating layer 34 as an example.

For example, a projection picture formed by the directional imaging device 30 is larger than an imaging picture formed by each single-layer imaging device. For example, the directional imaging device 30 can implement full window imaging, that is, the projection picture formed by the directional imaging device 30 can cover the entire window. Usually, a field of view (FOV) may be used to measure a size of the picture. For example, with respect to a full window picture, a range of a horizontal field of view for the driver's eyes to view the image is greater than or equal to 15 degrees, for example, not less than 20 degrees, for example, not less than 25 degrees, for example, not less than 30 degrees, for example, between 15 degrees and 100 degrees; a range of a vertical field of view is greater than or equal to 5 degrees, for example, not less than 15 degrees, for example, not less than 20 degrees, for example, not less than 25 degrees, for example, between 5 degrees and 30 degrees. Therefore, the field of view of the head up display system can be increased, which implements imaging with an extra-large field of view under low power consumption. The above-described "horizontal" and "vertical" are two mutually perpendicular directions; taking a vehicle coordinate system as an example, the above-described "horizontal" may refer to a vehicle width direction in the vehicle coordinate system, and the above-described "vertical" may refer to a vehicle height direction in the vehicle coordinate system.

The processor is configured to determine to-be-displayed target information and a target imaging device, and control the target imaging device to display the target information; for example, the target imaging device is an imaging device selected from a group consisting of the directional imaging device 30 and the plurality of single-layer imaging devices (e.g., the first single-layer imaging device 11, the second single-layer imaging device 12, the third single-layer imaging device 13, etc.) in the imaging device group.

For example, before controlling the target imaging device to display the to-be-displayed target information, the processor may also output the to-be-displayed target information to the target imaging device, or output the to-be-displayed target information to other device connected with the target imaging device, and further, the other device can transmit the to-be-displayed target information to the target imaging device.

Figure 4C:
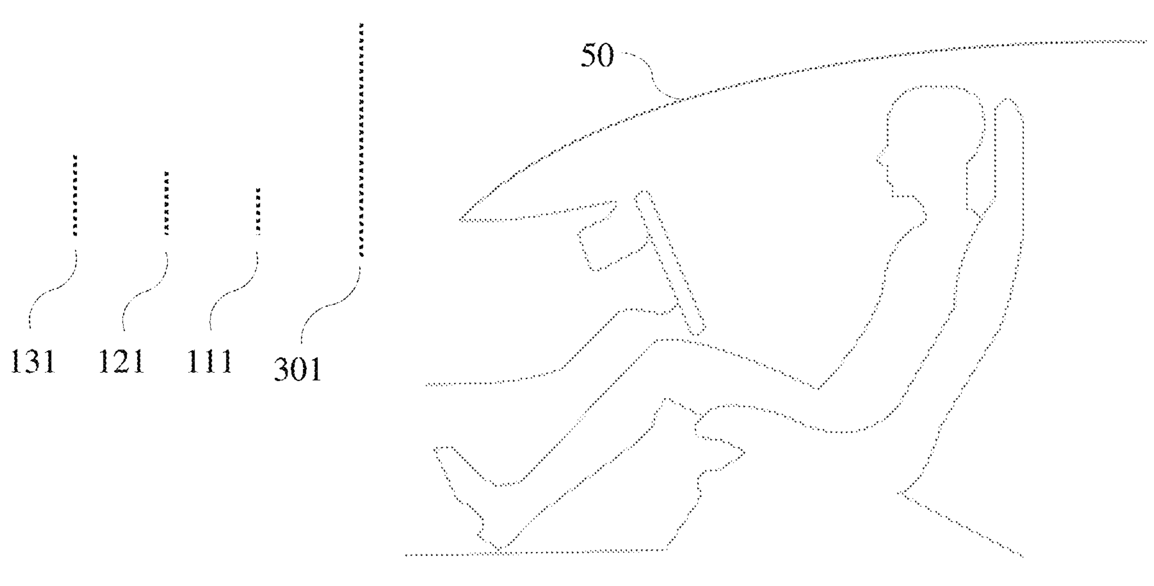
FIG. 4C shows a schematic diagram of imaging outside a reflective imaging part by a head up display system provided by at least one embodiment of the present disclosure.

For example, in some embodiments of the present disclosure, the first single-layer imaging device 11 and the second single-layer imaging device 12 in the imaging device group are respectively used for imaging; and the first object distance of the first single-layer imaging device 11 is different from the second object distance of the second single-layer imaging device 12. Based on the imaging principle of the concave reflective element 20, it may be known that, the closer the propagation path length of the imaging light (e.g., the first imaging light, the second imaging light, or the subsequent third imaging light, etc.) emitted by the single-layer imaging device (e.g., the first single-layer imaging device 11, the second single-layer imaging device 12, or the subsequent third single-layer imaging device 13, etc.) and propagating to the concave reflective element 20 is to a focal length of the concave reflective element 20, the farther the position of imaging by the concave reflective element 20 is, that is, the greater the image distance of an image formed by the concave reflective element 20 is; correspondingly, under an action of the reflective imaging part 50, the image formed by the concave reflective element 20 may have a corresponding virtual image formed on the other side of the reflective imaging part 50; and the greater the image distance of the virtual image formed by the concave reflective element 20 is, the farther the virtual image formed by the reflective imaging part 50 is from the reflective imaging part 50. As shown in FIG. 4C, FIG. 4C is shown by taking the imaging device group including three single-layer imaging devices (i.e., the first single-layer imaging device 11, the second single-layer imaging device 12, and the third single-layer imaging device 13) as an example; and the three single-layer imaging devices form images respectively at a first magnified imaging position 111, a second magnified imaging position 121 and a third magnified imaging position 131, so that the head up display system can form images at different positions from the reflective imaging part 50, that is, form multi-layered images. For example, the first object distance and the second object distance may both be less than a focal length of the concave reflective element 20, so that the concave reflective element 20 can form magnified virtual images of the first single-layer imaging device 11 and the second single-layer imaging device 12.

For example, the head up display system may further include a reflective imaging part 50; the imaging light emitted by the single-layer imaging device in the imaging device group may be incident to the reflective imaging part 50 after being reflected by the concave reflective element 20, and then be reflected by the reflective imaging part 50 to a pre-set range, for example, the eyebox range or eyebox ranges 62, so that the driver can observe the image formed by the single-layer imaging device within the eyebox range or eyebox ranges 62. The eyebox range or eyebox ranges 62 in the embodiments of the present disclosure refers to a range for the driver to view the image on the reflective imaging part 50, which approximately corresponds to a position of the driver's head; and a size of the eyebox range or eyebox ranges 62 may be determined according to actual situations.

For example, convergence of light can be implemented by the direction control element 32. For example, referring to FIG. 3, the light source device includes a plurality of light sources 31, the light sources 31 are arranged at different positions, in FIG. 3, it is described by taking the light source device including seven light sources 31 as an example; accordingly, seven direction control elements 32 may be provided to respectively control directions of light emitted by the seven light sources 31. As shown in FIG. 3, in a case that there is no diffusing element 33, the direction control element 32 converges light emitted by the plurality of light sources 31 to a pre-set region 61. In FIG. 3, it is described by taking the pre-set region 61 as a point position as an example. In some embodiments of the present disclosure, the pre-set region 61 may also be a very small region, as long as light emitted by the light source device is converged to the region. For example, direction of light emitted by the light source 31 can be adjusted by setting orientations of direction control elements 32 at different positions, so as to implement convergence of light.

For example, in some embodiments of the present disclosure, light is diffused by the diffusing element 33, and a light spot of a pre-set shape with a larger imaging range (e.g., the eyebox range or eyebox ranges 62) is formed, so as to facilitate the driver to view an image formed by the directional imaging device 30 within a larger range.

For example, it is described by taking a leftmost direction control element 32 in FIG. 3 as an example, as shown in FIG. 3, in the case that there is no diffusing element 33, light A emitted by the leftmost light source 31 can irradiate to the pre-set region 61 along a light path a; in a case that the diffusing element 33 is provided outside the direction control element 32, the diffusing element 33 diffuses light A into a plurality of rays (including a ray A1, a ray A2, etc.) and diffuses the rays into a range, that is, the eyebox range or eyebox ranges 62, so as to facilitate the user to view the image formed by the directional imaging device 30 within the eyebox range or eyebox ranges 62.

For example, the diffusing element may be a diffractive optical element (DOE), for example, a BeamShaper; a size and a shape of the light spot are determined by a microstructure of the BeamShaper; and the shape of the light spot includes but is not limited to circle, ellipse, square, rectangle, and a batwing shape. For example, a diffusion angle of the diffused light spot in a side-view direction (e.g., a direction perpendicular to a road surface on which the vehicle is located) may be 2 degrees to 10 degrees, for example, may be 10 degrees or 5 degrees; and a diffusion angle in a front-view direction (e.g., a direction in which a main driver and a co-pilot of the vehicle extend) may be 5 degrees to 50 degrees, for example, may be 10 degrees, 20 degrees or 30 degrees.

For example, the number of the direction control elements 32 may be a plural; different direction control elements 32 are arranged at different positions, and are configured to adjust exit directions of light emitted by light sources 31 at different positions; and exit directions of the light emitted by the light sources 31 at different positions point to a same pre-set region 61. As shown in FIG. 3, the number of direction control elements 32 in FIG. 3 is seven. For example, one direction control element 32 may adjust light emitted by one light source 31, or may also adjust light emitted by a plurality of light sources 31, which is not limited in the embodiments of the present disclosure.

Those skilled in the art can understand that a diffusion effect of the diffusing element 33 is schematically illustrated in FIG. 3, and the diffusing element 33 can diffuse light into the eyebox range or eyebox ranges 62, rather than completely confine light emitted by the light source device to the eyebox range or eyebox ranges 62. That is, light A may form a light spot of a larger range after passing through the diffusing element 33, and light emitted by other light sources 31 may form other light spots through the diffusing element 33, but light emitted by all the light sources 31 may almost all reach the eyebox range or eyebox ranges 62.

In the embodiments of the present disclosure, light emitted by the light source device is incident to the light modulating layer 34 after passing through the direction control element 32, so that the light modulating layer 34 can emit directional imaging light towards the eyebox range or eyebox ranges 62 during operation, thereby making the directional imaging light converged into the eyebox range or eyebox ranges, which can improve brightness of the directional imaging light, facilitate, under an action of the diffusing element 33, the driver to view the image formed by the directional imaging device 30 in the eyebox range or eyebox ranges 62, and further expand a visible range while improving brightness of light.

In some embodiments of the present disclosure, because the directional imaging light can be converged, the driver can observe the virtual image formed by the reflective imaging part 50 without particularly high brightness of the directional imaging device 30; and the directional imaging device 30 can have a larger area, so that a user (e.g., a driver) can view an image of a larger range formed by reflection of the reflective imaging part 50. For example, the directional imaging device 30 may be laid on a surface of an IP table of the vehicle.

Figure 5:
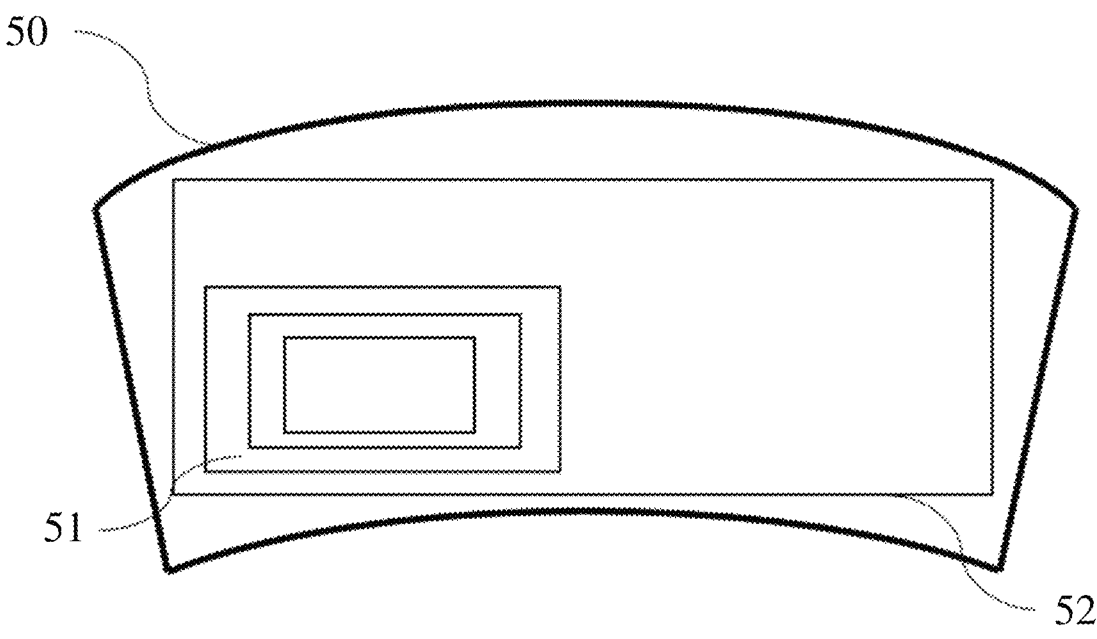
FIG. 5 shows a first schematic diagram of an imaging region on the reflective imaging part provided by at least one embodiment of the present disclosure.
Figure 6:
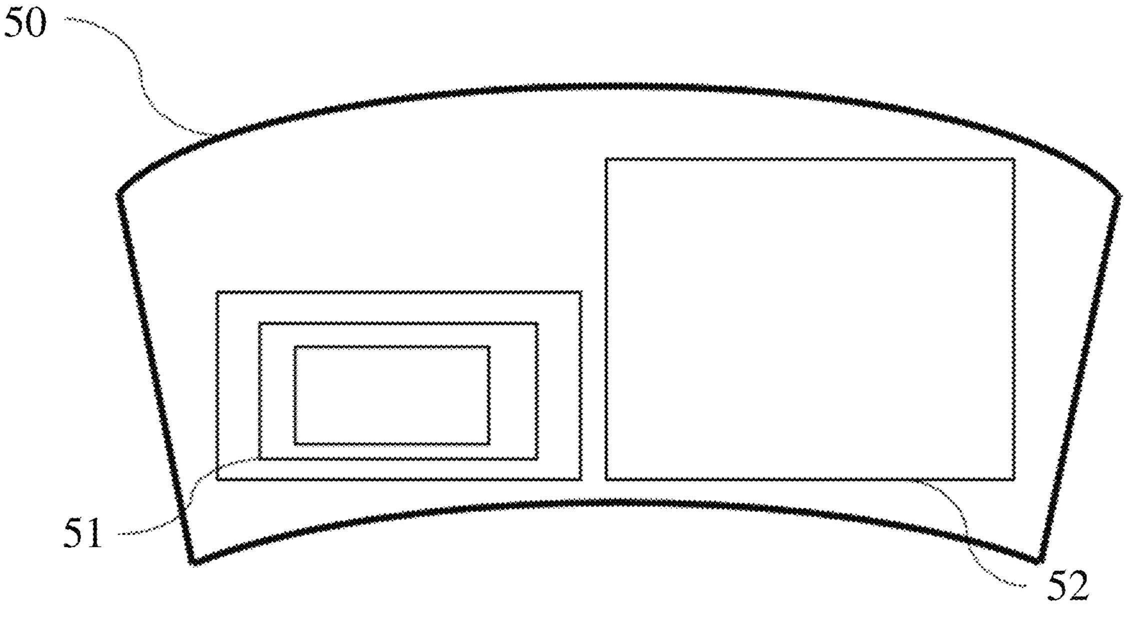
FIG. 6 shows a second schematic diagram of an imaging region on the reflective imaging part provided by at least one embodiment of the present disclosure.

For example, referring to FIG. 5 and FIG. 6, the directional imaging light may be incident to a surface region of the reflective imaging part 50; the region may be a directional imaging region 52; the driver can observe a virtual image formed at a directional imaging position 301 through the directional imaging region 52; and the virtual image is an image formed by the directional imaging device 30 through reflection of the reflective imaging part 50. For example, a region where the imaging light emitted by the imaging device group is incident to the surface of the reflective imaging part 50 is a magnified imaging region 51; the driver can view a virtual image at a corresponding magnified imaging position (e.g., a first magnified imaging position 111, a second magnified imaging position 121, a third magnified imaging position 131, etc.) through the magnified imaging region 51; and the virtual image is an image formed by the reflective imaging part 50 and corresponding to a single-layer imaging device in the imaging device group. For example, different single-layer imaging devices in the imaging device group may correspond to different magnified imaging regions; in FIG. 5 and FIG. 6, it is described by taking three magnified imaging regions included as an example; the first single-layer imaging device 11, the second single-layer imaging device 12 and the third single-layer imaging device 13 respectively correspond to different magnified imaging regions. For example, the first imaging light emitted by the first single-layer imaging device 11 can be incident to a magnified imaging region on a surface of the reflective imaging part 50; the reflective imaging part 50 forms a virtual image corresponding to the first single-layer imaging device 11 at the first magnified imaging position 111; and the driver can view the virtual image at the first magnified imaging position 111 through the magnified imaging region.

For example, in some embodiments, the directional imaging device 30 can form an image of a larger range; and an area of the directional imaging region 52 on the reflective imaging part 50 may be larger than an area of a single magnified imaging region 51. For example, the magnified imaging region 51 may be located in the directional imaging region 52, as shown in FIG. 5; or the magnified imaging region 51 and the directional imaging region 52 are two different regions, as shown in FIG. 6; or, the magnified imaging region 51 and the directional imaging region 52 may also be two regions that partially overlap with each other.

In some embodiments, light emitted by the imaging device group and the directional imaging device 30 may cover the entire reflective imaging part 50; light cannot be seen by the driver until it reaches the eyebox range or eyebox ranges 62 after being reflected by the reflective imaging part 50; the "imaging light" in the embodiments of the present disclosure refers to light emitted by an imaging device and can be imaged within the eyebox range or eyebox ranges 62; accordingly, the "directional imaging light" refers to light emitted by the directional imaging device and can be imaged within the eyebox range or eyebox ranges 62; and the "imaging light" refers to light emitted by the single-layer imaging device and can be imaged within the eyebox range or eyebox ranges 62. That is, for the surface of the reflective imaging part 50, only a region to which the imaging light that may be imaged within the eyebox range or eyebox ranges 62 is incident is taken as a magnified imaging region or a directional imaging region.

In the embodiments of the present disclosure, the head up display system further includes a processor configured to determine to-be-displayed target information, and determine which imaging device is needed to display the target information. For example, the processor may be configured to select a target imaging device from a group consisting of the directional imaging device 30 and the plurality of single-layer imaging devices in the imaging device group, and control the target imaging device to display the target information, so that the reflective imaging part 50 forms a virtual image at a corresponding imaging position, and target information can be displayed at the imaging region for the driver to view. For example, in a case that a vehicle speed currently needs to be displayed in the directional imaging region, the vehicle speed may be taken as the target information; and because the directional imaging device 30 can allow the user to view the image in the directional imaging region, the directional imaging device 30 may be taken as the target imaging device.

It should be noted that, "displaying target information in the imaging region" in the embodiments of the present disclosure refers to that the driver can view the target information through the imaging region, so that from the driver's point of view, the target information is displayed in the imaging region, but the virtual image corresponding to the target information is actually located outside the reflective imaging part 50, for example, at the imaging position (including a first magnified imaging position 111, a second magnified imaging position 121, a third magnified imaging position 131) in FIG. 4C. The same or similar descriptions as "displaying target information in the imaging region" in the embodiments of the present disclosure (e.g., the subsequent "displaying target information at the target position", etc.) are only for convenience of description, and are not used to limit the case that the imaging region, etc. per se of the reflective imaging part 50 can display target information. For example, the imaging region is a portion of the directional imaging region or the magnified imaging region.

In a head up display system provided by the embodiments of the present disclosure, a plurality of single-layer imaging devices having different object distances in the imaging device group can be used to form images at a plurality of imaging positions having different distances from the reflective imaging part; and an imaging device whose image distance is closest to the object is selected for fitting, so as to reduce parallax. In addition, the direction control element 32 can converge directional imaging light of different incident angles into a pre-set region and diffuse the light to the eyebox range or eyebox ranges, which thus, can improve brightness of the directional imaging light, and can also have a larger visual range; the directional imaging device 30 may be arranged in a large range, so that the directional imaging region of a large area is formed on the surface of the reflective imaging part, to implement imaging in a large scale. The processor selects a suitable imaging device as the target imaging device, and controls the target imaging device to display target information on the surface of the reflective imaging part, so that the reflective imaging part can display images in a larger range and/or in multiple layers, which can improve the display effect of the head up display system.

On the basis of the above-described embodiments, the processor may also be configured to determine a target position, in which the target position is a position of the reflective imaging part for displaying the to-be-displayed target information; determine a target imaging device according to the target position; and control the target imaging device to display the to-be-displayed target information at the target position. For example, the processor may determine the to-be-displayed target information, and may also determine the target position, that is, determine a position where the target information is displayed on the reflective imaging part 50; for example, the processor may also determine the imaging region containing the target position, take the imaging device corresponding to the imaging region as the target imaging device, and control the target imaging device to display the target information at the target position; in which the imaging region is a region where the imaging light can be incident to the surface of the reflective imaging part 50.

For example, if imaging regions of imaging layers with different depths are consistent on the reflective imaging part 50, the target imaging device may be further determined according to the image distance.

In some embodiments of the present disclosure, each item of target information has a corresponding target position, and the target position may be pre-set, or may also be a position determined based on a current actual scene. For example, if the target information is a vehicle speed, and the vehicle speed is pre-set to be displayed in a lower left position of the reflective imaging part 50, a position corresponding to the lower left position of the reflective imaging part 50 may be directly taken as the target position; or in a case that there is currently a pedestrian outside, a graphic corresponding to the pedestrian's position needs to be formed to prompt the driver, the graphic may be the target information, and the position where the target information needs to be displayed on the reflective imaging part 50 is the target position; for example, the pedestrian may be projected to a position on the reflective imaging part 50, and this position may be used as the target position. For example, the target position may be a position point, or may also be a position range, which can be specifically determined based on actual situations.

In some embodiments of the present disclosure, different imaging devices correspond to different imaging regions on the reflective imaging part 50; if the target position is located in a certain imaging region, the imaging device corresponding to the imaging region may be taken as the target imaging device; and based on the target imaging device, the corresponding target information can be displayed at the target position. For example, the target position is located in the magnified imaging region corresponding to the first single-layer imaging device 11; and the first single-layer imaging device 11 may be taken as the target imaging device. For example, if different imaging regions overlap with each other and the target position is located in a plurality of imaging regions, one imaging region may be selected from among them; for example, the imaging region may be randomly selected, or may be selected based on a pre-set selection rule.

For example, the head up display system may display in a fitting manner based on an augmented reality (AR) principle. For example, the head up display system may also be based on mixed reality (MR); and the mixed reality is an implementation mode of the augmented reality technology. For example, "fitting" may refer to that, when a user observes an image formed by the head up display system, the image can be displayed to match an external object.

For example, in a case that a projection position where the external object is projected (or mapped) to the reflective imaging part 50 is located within the directional imaging region, the external object is taken as a target object; the directional imaging region is a region where the directional imaging light emitted by the directional imaging device 30 can be incident to the surface of the reflective imaging part 50. Meanwhile, the projection position within the directional imaging region or an edge of the projection position is taken as the target position.

For example, the edge of the projection position includes an outline of the projection position and/or a perimeter of the projection position, for example, the perimeter may be an outer position close to the outline.

In the embodiments of the present disclosure, the external object is a thing located on an outer side of the reflective imaging part 50, which includes stationary objects such as a road surface and an indicator, etc., or may also include a movable object such as a motor vehicle, a pedestrian, an animal, and a non-motor vehicle, etc. The external object can be projected and mapped to the reflective imaging part 50; for example, the external object can be projected and mapped to a certain position of the reflective imaging part 50 along a direction towards the eyebox range or eyebox ranges 62, and the position is the projection position, that is, the external object, the projection position, and the eyebox range or eyebox ranges are collinear, so that the driver can see the external object through the projection position at the eyebox range or eyebox ranges. For example, the processor may further be configured to: take the directional imaging device 30 as the target imaging device in a case that the projection position is located within the directional imaging region; and take the external object as the target object that can be displayed in an AR mode; for example, the projection position or the edge of the projection position located in the magnified imaging region is taken as the target position, and further the target imaging device (i.e., the directional imaging device 30) can be controlled to display the target information at the target position; because the target position is consistent with the projection position of the external object, the external object, the target information displayed on the reflective imaging part 50, and the eyebox range or eyebox ranges can be made to be collinear, so the driver at the eyebox range or eyebox ranges can view the target information fitting with the external object (e.g., framing the external object, etc.), which can prompt the driver more effectively.

For example, the processor may further be configured to: in a case that the projection position of the external object projected (or mapped) to the reflective imaging part 50 is located within the magnified imaging region, take the external object as the target object, and determine a target distance between a reference object (e.g., a vehicle, for example, a motor vehicle, for example, a HUD device or a collecting device, etc.) and the target object; in which the magnified imaging region is a region where the imaging light emitted by the imaging device group can be incident to the surface of the reflective imaging part 50; take the projection position or the edge of the projection position located within the magnified imaging region as the target position; select the target imaging device from the imaging device group according to the target distance, for example, take an image distance corresponding to a size of the target distance as a target image distance, and take a single-layer imaging device corresponding to the target image distance as the target imaging device; for example, the image distance is a distance between the virtual image of the single-layer imaging device that is formed by the concave reflective element 20 and the concave reflective element 20; or a distance between the virtual image and reflective imaging part 50, which may also be equivalent to a distance from the virtual image to the eyebox range or eyebox ranges 62.

It should be noted that, in some embodiments of the present disclosure, the projection position where the external object is projected (or mapped) to the reflecting imaging part may be a projection region where the external object falls on the reflecting imaging part 50 in a case that the user uses the head up display system and/or the vehicle and observes the external object within an observation region (e.g., the eyebox range or eyebox ranges). For example, a portion of a line connecting the external object and the eyebox range or eyebox ranges that intersects with the reflecting imaging part (reflecting device) 50 may be regarded as the projection position of the external object on the reflecting imaging part.

In some embodiments of the present disclosure, similar to the case that the projection position of the external object is located in the directional imaging region, the processor may be further configured to: in a case that the projection position of the external object is located within the magnified imaging region, take the external object as a target object for AR display, and take a corresponding single-layer imaging device in the imaging device group as the target imaging device. Because the imaging device group includes a plurality of single-layer imaging devices, in the embodiments of the present disclosure, which single-layer imaging device is the target imaging device is determined based on a distance between the external object and the head up display system (i.e., the target distance); for example, the target distance may specifically be simplified as the distance between the external object and the reflective imaging part 50.

For example, because different single-layer imaging devices in the imaging device group have different object distances, based on the imaging law, it may be known that, different single-layer imaging devices also correspond to different image distances, that is, distances between the virtual images formed by the single-layer imaging devices and the concave reflective element 20 are different; and the image distances may be mapped to different magnified imaging positions, for example, the first magnified imaging position 111, the second magnified imaging position 121, the third magnified imaging position 131, etc., on an outer side of the reflective imaging part 50 one by one; and the greater the image distance is, the farther the corresponding magnified imaging position is. After the target distance of the target object is determined, the magnified imaging position closest to the target object can be determined, and further the single-layer imaging device corresponding to the closest magnified imaging position is taken as the target imaging device. For example, if the external object is in the vicinity of the second magnified imaging position 121, the second single-layer imaging device can be taken as the target imaging device. For example, a distance range may be allocated according to an image distance of each single-layer imaging device; and which image distance matches the target distance is determined according to a distance range that the target distance falls into, so as to further determine which single-layer imaging device is to be taken as the target imaging device.

For example, the processor may further be configured to: in a case that the projection position of the external object projected (or mapped) to the reflective imaging part 50 is located within the magnified imaging region and within the directional imaging region, take the external object as the target object, and determine a target distance between the reference object and the target object; moreover, take the projection position or the edge of the projection position as the target position; take the image distance corresponding to the target distance as the target image distance, and take the imaging device corresponding to the target image distance including the directional imaging device 30, the first single-layer imaging device 11, the second single-layer imaging device 12, the third single-layer imaging device 13, etc.) as the target imaging device. For example, the image distance of the directional imaging device 30 may be simplified as the distance between the directional imaging position 301 and the reflective imaging part 50. For example, the directional imaging device 30 forms a virtual image outside the reflective imaging part 50, and a distance between the virtual image and the reflective imaging part 50 is the image distance; because the distance between a human eye and the reflective imaging part 50 is basically fixed, the image distance may also be equivalent to the distance from the virtual image to the eyebox range or eyebox ranges 62.

In some embodiments of the present disclosure, the most suitable imaging device is determined as the target imaging device based on the target distance of the target object, so that a distance difference between the virtual image formed by the target imaging device outside the reflective imaging part 50 and the target object may be the smallest, and the virtual image can fit better with the target object, which can effectively reduce parallax, and can improve an effect of augmented reality display.

For example, in some embodiments of the present disclosure, the processor is further configured to: with respect to a same external object, control the directional imaging device to display first information of the external object, and control the imaging device group to display second information of the external object, in which contents included in the first information and the second information are at least partially different; or, with respect to a plurality of external objects, adopt the directional imaging device to display an external object that satisfies a first selection condition, and adopt the imaging device group to display the external object that satisfies a second selection condition.

Figure 7:
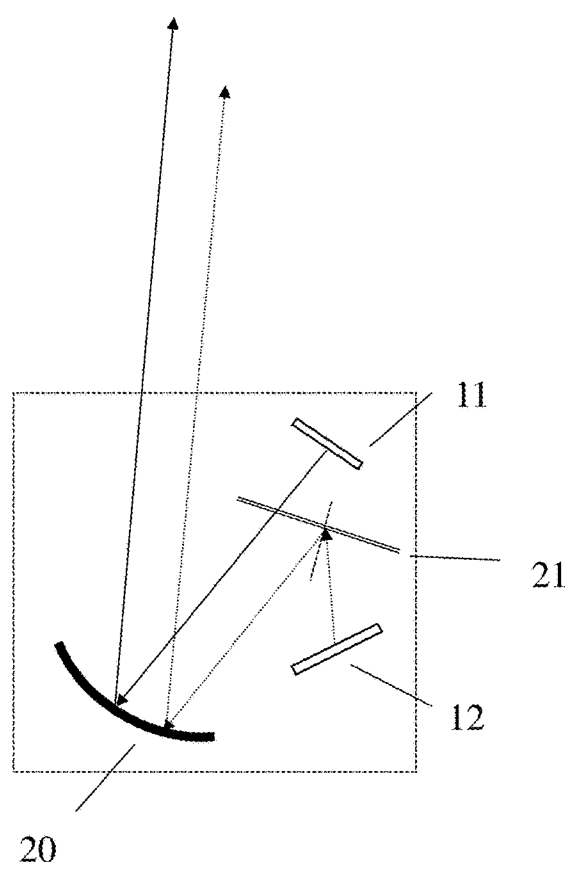
FIG. 7 shows a second structural schematic diagram of imaging by an imaging device group in a head up display system provided by at least one embodiment of the present disclosure.

For example, on the basis of the above-described embodiments, referring to FIG. 7, the head up display system further includes a first transflective element 21; the first transflective element 21 is capable of transmitting light having a first characteristic and reflecting light having a second characteristic. For example, the first single-layer imaging device 11 is arranged on one side of the first transflective element 21, the second single-layer imaging device 12 and the concave reflective element 20 are arranged on the other side of the first transflective element 21, in which the "one side" and "the other side" as described above are opposite sides; the first imaging light has the first characteristic, the second imaging light has the second characteristic, and the first transflective element is configured to transmit the first imaging light and reflect the second imaging light.

In the embodiments of the present disclosure, the first transflective element 21 is adopted to adjust a position of a certain single-layer imaging device in the imaging device group, so that imaging light emitted by the single-layer imaging device will not be shieled by other single-layer imaging devices; in FIG. 7, it is shown by taking a position of the second single-layer imaging device 12 being changed as an example. The first transflective element 21 is capable of transmitting light having the first characteristic, so that the first imaging light can be normally transmitted and incident to the concave reflective element 20, and the first single-layer imaging device 11 can form an image normally; in addition, the first transflective element 21 may also reflect light having the second characteristic, so that the second imaging light can be reflected by the first transflective element 21 and further incident to the concave reflective element 20 to implement imaging. For example, the first characteristic and the second characteristic may be two different characteristics, and the "characteristic" in the embodiments of the present disclosure refers to a property possessed by light, for example, polarization characteristic, wavelength characteristic, etc. For example, the first transflective element is capable of transmitting polarized light in a first polarization direction, and is capable of reflecting polarized light in a second polarization direction, in which the first polarization direction and the second polarization direction are perpendicular to each other; the first single-layer imaging device 11 may emit first imaging light in the first polarization direction, and the second single-layer imaging device 12 may emit second imaging light in the second polarization direction, which may implement imaging by the first single-layer imaging device 11 and the second single-layer imaging device 12 without affecting each other. The first transflective element in the embodiments of the present disclosure may specifically be a reflective polarizer mirror (RPM) film or a dual brightness enhancement film (DBEF).

For example, in other embodiments, the first characteristic and the second characteristic may also be a same characteristic, and the first transflective element is a transflective medium. For example, transmittance of the first transflective element to light may be 5% to 95%, and reflectance of the first transflective element to light may be 5% to 95%; for example, the first transflective element is a transflective medium, transmittance and reflectance of the first transflective element are both 50%; for example, in a case that the first imaging light emitted by the first single-layer imaging device 11 passes through the first transflective element 21, one half of the light is transmitted, and the other half is reflected, so that the one half of the first imaging light can be transmitted to the concave reflective element 20; correspondingly, in a case that the second imaging light emitted by the second single-layer imaging device 12 reaches the first transflective element 21, one half of the second imaging light can be reflected to the concave reflective element 20, so that imaging of the first single-layer imaging device 11 and the second single-layer imaging device 12 can also be implemented. For example, transmittance of the first transflective element to light is about 30%, and reflectance thereof is about 70%; in a case that first imaging light emitted by a first image source 11 passes through the first transflective element 21, about 30% is transmitted, and about 70% are reflected, so that about 30% of the first imaging light can be transmitted to the concave reflective element 20; correspondingly, in a case that second imaging light emitted by a second image source 12 reaches the first transflective element 21, about 70% of the second imaging light can be reflected to the concave reflective element 20, which can implement imaging of the first image source 11 and the second image source 12.

For example, those skilled in the art can understand that the case that the first imaging light has the first characteristic may refer to that the first imaging light has only the first characteristic; or, part of characteristics of the first imaging light is the first characteristic, and the first imaging light may also have other characteristics, or may even have the second characteristic. As the example described in the above paragraph, if the first single-layer imaging device 11 may emit the first imaging light that is natural light, the first imaging light may be decomposed into polarized light of a first polarization characteristic and polarized light of a second polarization characteristic, the first imaging light may have the first characteristic and the second characteristic at the same time, for example, the portion of light having the first characteristic in the first imaging light can still be transmitted through the first transflective element 21, and a portion of the first imaging light can still be incident to the concave reflective element 20, without affecting imaging of the first single-layer imaging device 11. Because light may be decomposed, the transflective element (e.g., the first transflective element 21, and the subsequent second transflective element 22, etc.) in the embodiments of the present disclosure may transmit light with a certain characteristic, which refers to that the transflective element may only transmit light having the characteristic, or may transmit a component of light that has the characteristic; correspondingly, the case that the transflective element is capable of reflecting light having a certain characteristic also has a similar meaning. For example, the first transflective element 21 can transmit horizontally polarized light and reflect vertically polarized light; if the first imaging light is light whose polarization direction is at an angle of 45 degrees to a horizontal direction, the first imaging light may be decomposed into horizontally polarized light and vertically polarized light; the horizontally polarized light in the first imaging light can be transmitted through the first transflective element 21, and it can also be considered as that "the first transflective element 21 is capable of transmitting light having the first characteristic". For example, the first characteristic and the second characteristic in the embodiments of the present disclosure may be a same type of characteristics, for example, both are polarization characteristics, or may be different types of characteristics, for example, the first characteristic is a polarization characteristic, and the second characteristic is a wavelength characteristic, which may be specifically determined based on the selected transflective element.

For example, in some embodiments, the head up display system further includes a second transflective element 22, and the imaging device group further includes a third single-layer imaging device 13; the third single-layer imaging device 13 is configured to emit third imaging light having a third characteristic that is incident to the concave reflective element 20; a third object distance corresponding to the third single-layer imaging device 13 is different from both the first object distance and the second object distance, and the third object distance is a propagation path length of the third imaging light from the third single-layer imaging device 13 to the concave reflective element 20 or a distance from the third single-layer imaging device 13 to the concave reflective element 20.

For example, the second transflective element 22 is capable of transmitting light having the first characteristic and reflecting light having the third characteristic; and the first transflective element 21 is also capable of transmitting light having the third characteristic. For example, the second transflective element 22 is arranged between the first single-layer imaging device 11 and the first transflective element 21, and the third single-layer imaging device 13 and the first transflective element 21 are arranged on a same side of the second transflective element 22; and FIG. 8 may be specifically referred to for details.

Figure 9:
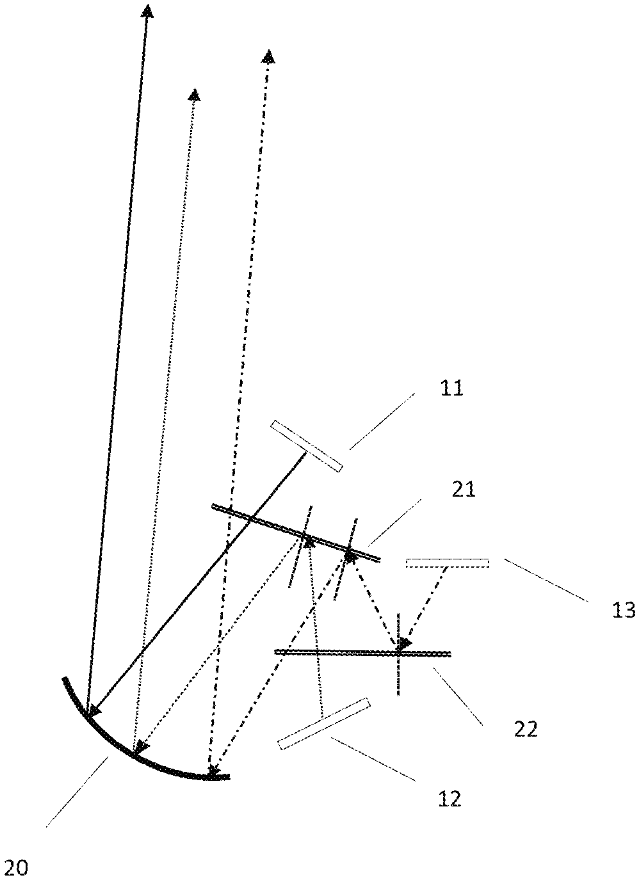
FIG. 9 shows a fourth structural schematic diagram of imaging by an imaging device group in a head up display system provided by at least one embodiment of the present disclosure.

Or, in other embodiments, the second transflective element 22 is capable of transmitting light having the second characteristic and reflecting light having the third characteristic; and the first transflective element 21 is also capable of reflecting light having the third characteristic; for example, the second transflective element 22 is arranged between the second single-layer imaging device 12 and the first transflective element 21, the third single-layer imaging device 13 and the first transflective element 21 are arranged on a same side of the second transflective element 22; and FIG. 9 may be specifically referred to for details.

In the embodiments of the present disclosure, the object distance of the third single-layer imaging device 13 (e.g., the third object distance) is also different from the object distances of the first single-layer imaging device 11 and the second single-layer imaging device 12, so that the three single-layer imaging devices can form images at different positions on an outer side of the reflective imaging part 50, for example, can respectively form images in three magnified imaging positions 111, 121 and 131 shown in FIG. 4C, so as to implement multi-layered imaging. For example, the third characteristic possessed by the third imaging light may be other characteristic different from both the first characteristic and the second characteristic.

Figure 8:
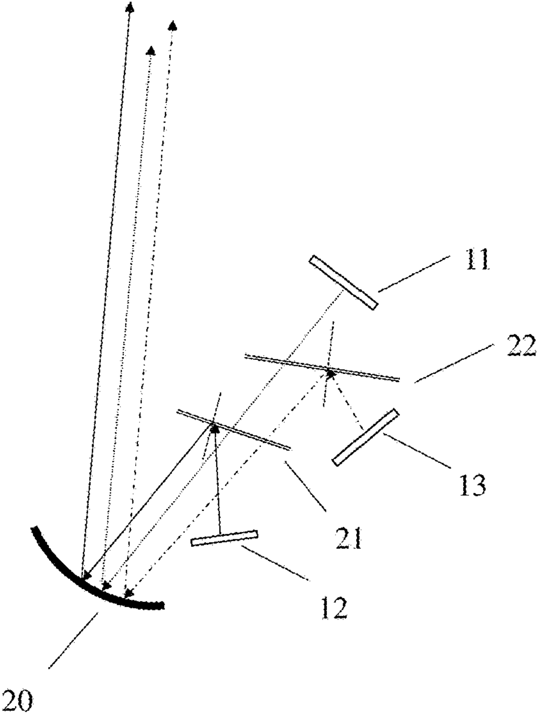
FIG. 8 shows a third structural schematic diagram of imaging by an imaging device group in a head up display system provided by at least one embodiment of the present disclosure.

As shown in FIG. 8, it is assumed that the second transflective element 22 can transmit light in the first polarization direction and reflect light in the third polarization direction, and the first transflective element 21 can transmit light in the fourth polarization direction and reflect light in the second polarization direction; for example, neither the first polarization direction nor the third polarization direction is perpendicular to the fourth polarization direction. The first imaging light emitted by the first single-layer imaging device 11 has a first polarization direction, and the first imaging light can be transmitted through the second transflective element 22 and incident to the first transflective element 21; because the first polarization direction and the fourth polarization directions are not perpendicular to each other, a portion of light in the fourth polarization direction can be decomposed from the first imaging light, so that the portion of light can be transmitted through the first transflective element 21; a portion of the first imaging light can be transmitted through the first transflective element 21, the first transflective element 21 capable of transmitting light in the fourth polarization direction may also be regarded as being capable of transmitting light in the first polarization direction (e.g., capable of transmitting light having the first characteristic), and the first transflective element 21 transmits a portion thereof; similarly, the third imaging light emitted by the third single-layer imaging device 13 has a third polarization direction, and when the third imaging light reaches the first transflective element 21, the first transflective element 21 can also transmit a portion of the third imaging light, that is, can transmit a component in the fourth polarization direction, so the first transflective element 21 can also transmit light having the third characteristic. In addition, the second imaging light emitted by the second single-layer imaging device 12 has a second polarization direction, which can be reflected by the first transflective element 21, so as to further implement imaging respectively by three single-layer imaging devices.

For example, in some embodiments, the first characteristic, the second characteristic and the third characteristic are three different wave bands. For example, in FIG. 8, the second transflective element 22 can transmit light of a first wave band and reflect light of a third wave band; the first transflective element 21 can reflect light of a second wave band and transmit light of other wave bands (including the first wave band and the second wave band); based on the two transflective elements, the imaging light emitted by the three single-layer imaging devices can also be incident to the concave reflective element 20, to respectively implement imaging. An imaging principle shown in FIG. 9 is basically similar to an imaging principle in FIG. 8; transflective elements of different properties are selected in FIG. 9; the first transflective element 21 can transmit light having the first characteristic, and can reflect light having the second characteristic and the third characteristic; and the second transflective element 22 can transmit light having the second characteristic and reflect light having the third characteristic. The solution shown in FIG. 9 is not described in detail here.

For example, it should be noted that, the three single-layer imaging devices in the embodiments of the present disclosure have different object distances, which may be that the propagation path lengths of the imaging light propagating to the concave reflective element 20 are different, in which the "propagation path length" is a path length of light propagating from a start point to an end point; if the light is directly incident from the start point to the end point, the propagation path length may be a distance between the start point and the end point; if light passes through one or more reflections before being incident to the end point, the propagation path length may be a sum of lengths of the light reaching respective positions that reflects the light sequentially. As shown in FIG. 9, the first imaging light emitted by the first single-layer imaging device 11 can be directly incident to the concave reflective element 20, so the first object distance may be a distance between the first single-layer imaging device 11 and the concave reflective element 20; the second imaging light emitted by the second single-layer imaging device 12 firstly reaches the first transflective element 21, and is reflected by the first transflective element 21 before being incident to the concave reflective element 20, so the second object distance of the second single-layer imaging device 12 may be a distance between the second single-layer imaging device 12 and the first transflective element 21, plus a distance between the first transflective element 21 and the concave reflective element 20. Correspondingly, the third object distance of the third single-layer imaging device 13 may be a sum of a distance between the third single-layer imaging device and the second transflective element 22, a distance between the second transflective element 22 and the first transflective element 21, and a distance between the first transflective element 21 and the concave reflective element.

Figure 10:
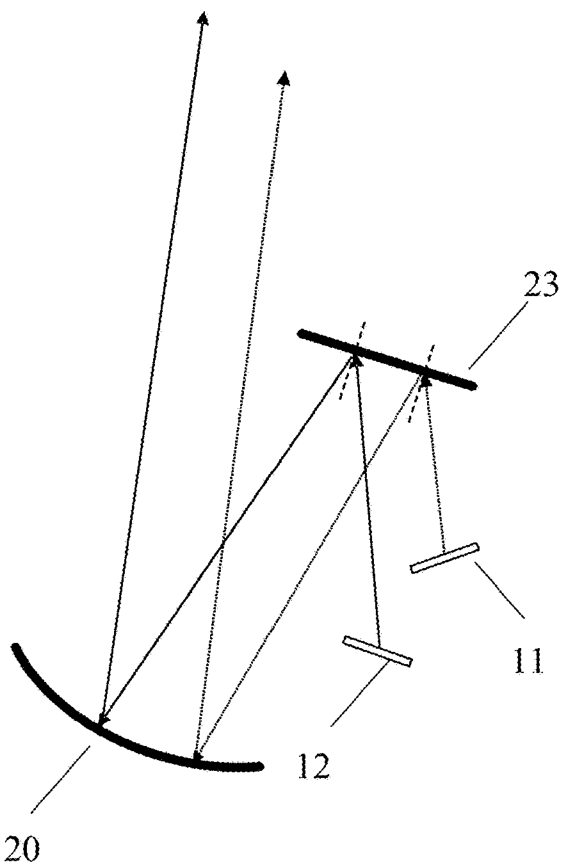
FIG. 10 shows a fifth structural schematic diagram of imaging by an imaging device group in a head up display system provided by at least one embodiment of the present disclosure.

For example, in some embodiments, in order to reduce a volume of the head up display system, the distance between the single-layer imaging device in the imaging device group and the concave reflective element 20 may be changed by a plane reflective element 23 in the reflective mirror group, so as to reduce the volume of the head up display system. As shown in FIG. 10, the head up display system may further include a reflective mirror group; the reflective mirror group includes one or more plane reflective elements 23; and the plane reflective element 23 is configured to reflect the imaging light emitted by the imaging device group to the concave reflective element 20.

In the embodiments of the present disclosure, the plane reflective element 23 is arranged on the propagation path of the imaging light, for changing the propagation path, so that the imaging light can be transmitted to the concave reflective element 20 by reflecting the imaging light.

For example, the reflective mirror group may include one plane reflective element 23; the plane reflective element is configured to reflect imaging light emitted by at least one single-layer imaging device (e.g., each single-layer imaging device) in the imaging device group to the concave reflective element 20. For example, a plurality of single-layer imaging devices may share one plane reflective element 23; as shown in FIG. 10, the first single-layer imaging device 11 and the second single-layer imaging device 12 share one plane reflective element 23.

Or, in other embodiments, the reflective mirror group may include a plurality of plane reflective elements 23 (e.g., at least two plane reflective elements 23); the imaging device group may include a plurality of single-layer imaging devices; the plurality of plane reflective elements are configured to reflect imaging light emitted by the plurality of single-layer imaging devices to the concave reflective element. For example, the plurality of plane reflective elements 23 are in one-to-one correspondence with the plurality of single-layer imaging devices in the imaging device group; each plane reflective element 23 is configured to reflect imaging light emitted by a corresponding single-layer imaging device to the concave reflective element 20. Or, two plane reflective elements (mirrors) 23 may correspondingly reflect imaging light emitted by three single-layer imaging devices, etc.; and correspondence between the plurality of plane reflective elements and the plurality of single-layer imaging devices is not limited in the embodiments of the present disclosure.

Figure 11:
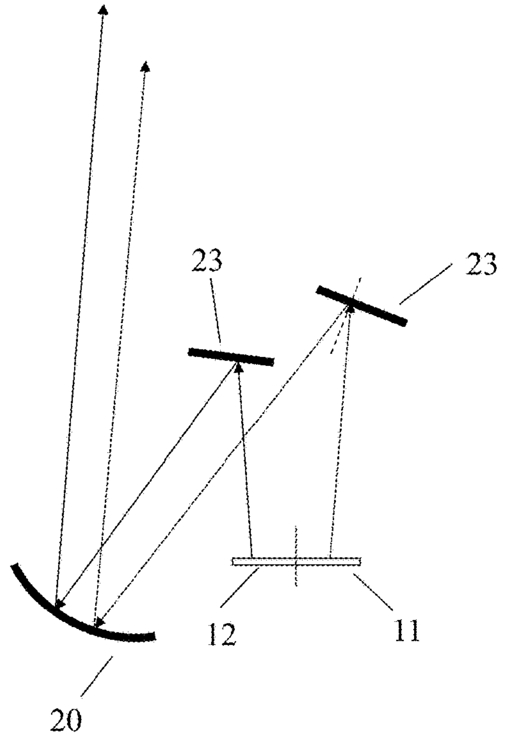
FIG. 11 shows a sixth structural schematic diagram of imaging by an imaging device group in a head up display system provided by at least one embodiment of the present disclosure.
Figure 12:
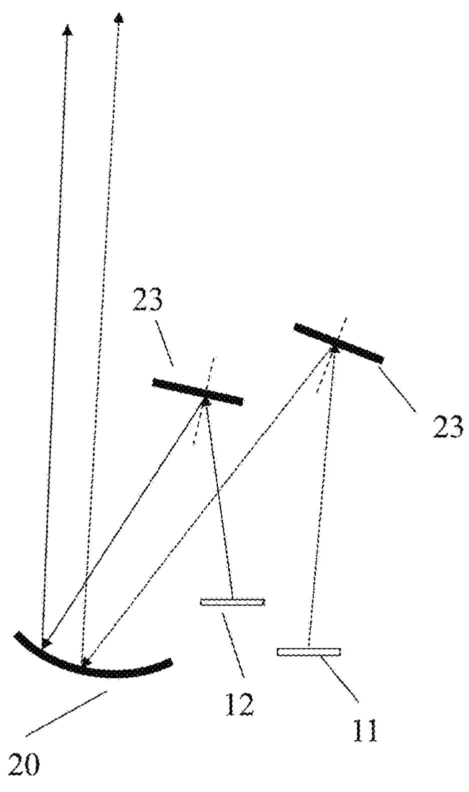
FIG. 12 shows a seventh structural schematic diagram of imaging by an imaging device group in a head up display system provided by at least one embodiment of the present disclosure.

In some embodiments of the present disclosure, different single-layer imaging devices may respectively use different plane reflective elements 23; as shown in FIG. 11 and FIG. 12, the first single-layer imaging device 11 and the second single-layer imaging device 12 respectively use the plane reflective elements 23 corresponding thereto; for example, a main single-layer imaging device may be provided, and image distances corresponding to different regions of the main single-layer imaging device may be changed by arranging the plane reflective elements 23 in different positions, so that the main single-layer imaging device can be divided into a plurality of single-layer imaging devices; as shown in FIG. 11, the main single-layer imaging device is divided into a first single-layer imaging device 11 and a second single-layer imaging device 12; and the plane reflective elements 23 corresponding to the first single-layer imaging device 11 and the second single-layer imaging device 12 are located at different positions, so that the first object distance of the first single-layer imaging device 11 and the second object distance of the second single-layer imaging device 12 are different from each other.

Figure 13:
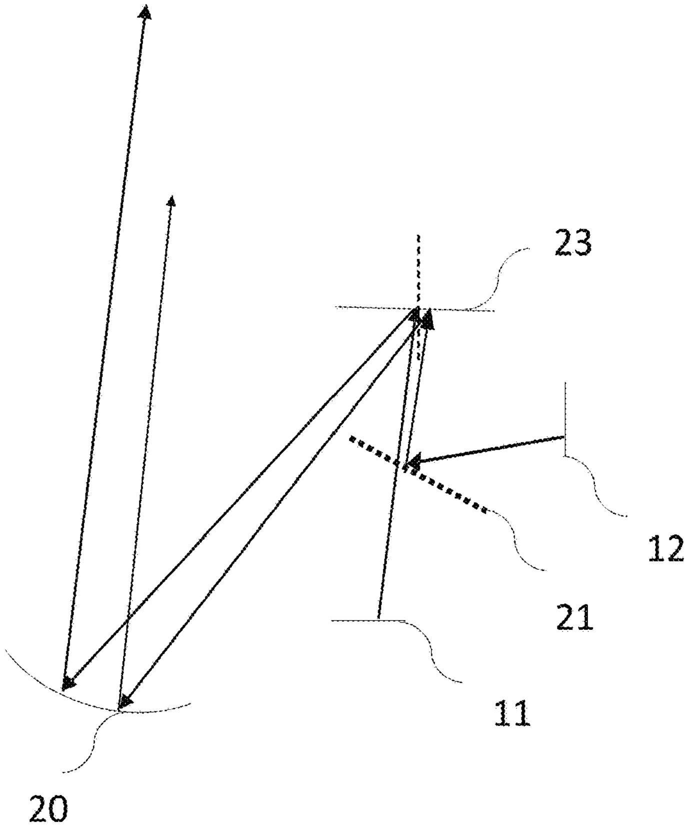
FIG. 13 shows an eighth structural schematic diagram of imaging by an imaging device group in a head up display system provided by at least one embodiment of the present disclosure.
Figure 14:
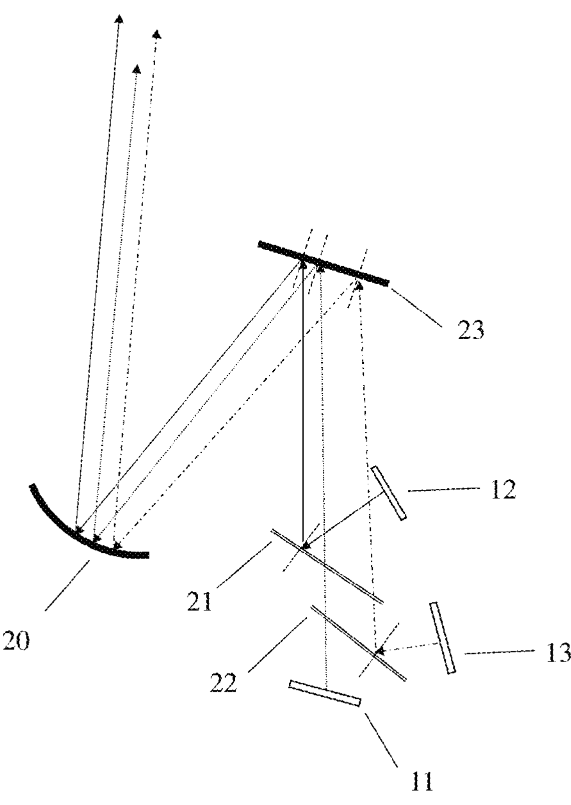
FIG. 14 shows a ninth structural schematic diagram of imaging by an imaging device group in a head up display system provided by at least one embodiment of the present disclosure.
Figure 15:
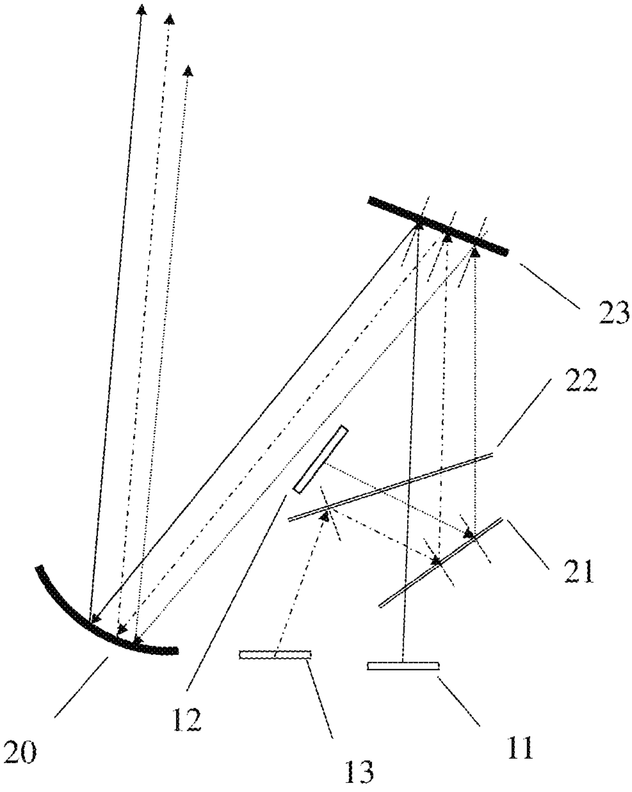
FIG. 15 shows a tenth structural schematic diagram of imaging by an imaging device group in a head up display system provided by at least one embodiment of the present disclosure.

For example, in a case that the head up display system includes a transflective element, the light path may also be changed based on the plane reflective element 23. Specifically, in the embodiment shown in FIG. 7 to FIG. 9, in a case that the plane reflective element 23 is added, FIG. 13 to FIG. 15 may be referred to for a structure thereof.

Figure 16:
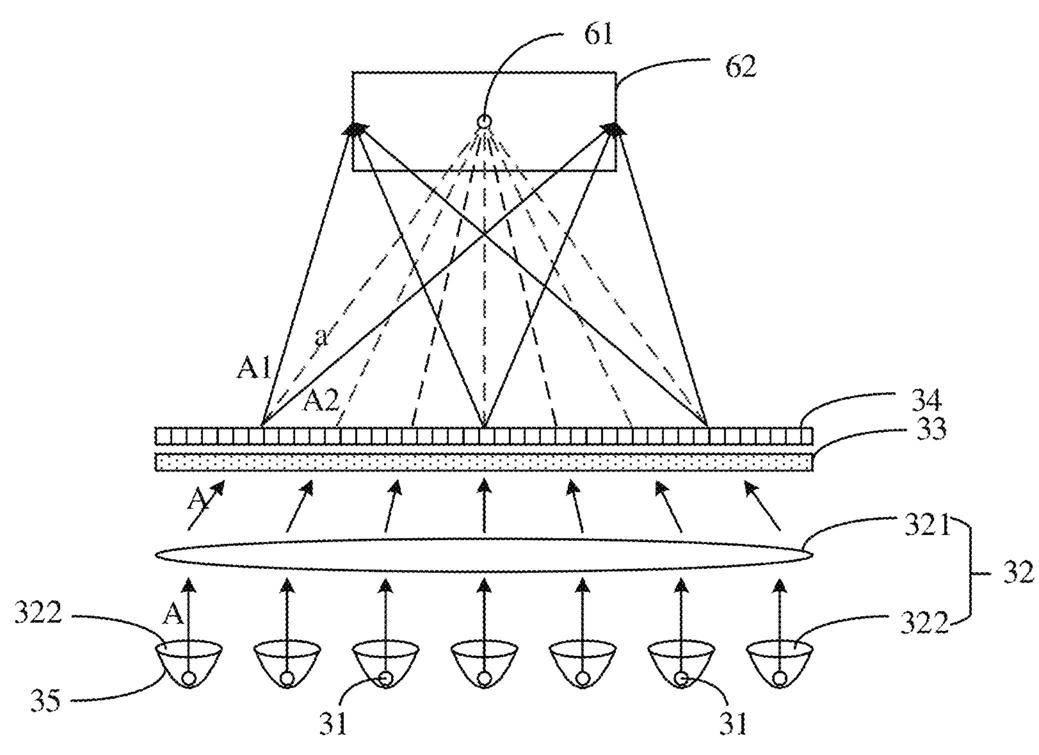
FIG. 16 shows a second structural schematic diagram of imaging by a directional imaging device in a head up display system provided by at least one embodiment of the present disclosure.

For example, on the basis of any one of the above-described embodiments, the direction control element 32 in the embodiments of the present disclosure may be a light converging element arranged towards the pre-set region 61, as shown in FIG. 3. Or, as shown in FIG. 16, the direction control element 32 includes at least one light converging element 321; the at least one light converging element 321 is arranged between the light source device and the diffusing element 33, and is configured to converge light emitted by different light sources included in the light source device, for example, the light converging element 321 is configured to converge light emitted by different light sources to a same pre-set region 61.

For example, the direction control element 32 includes a collimating element 322; the collimating element 322 is configured to adjust an exit direction of light emitted by a light source corresponding thereto into a pre-set angle range, and emit the adjusted light to the diffusing element 33 through at least one light converging element. For example, the pre-set angle range may be 0 degrees to 35 degrees; for example, the collimated light may be parallel or substantially parallel light.

With respect to the light converging element, the parallel/collimated light is easy to control, for example, the parallel light will be focused by passing through a convex lens; while with respect to disordered light, the light converging element has a poor control effect on the light. Therefore, in the embodiments of the present disclosure, by adding the collimating element, light is adjusted to be substantially parallel as much as possible, which can ensure the light to be easily controlled.

For example, in a case that the direction control element 32 includes the collimating element 322, the light converging element 321 may be arranged between the collimating element 322 and the diffusing element 33; the light converging element 321 is configured to converge different light rays to a same pre-set region 61. For example, different light rays may also be converged to a pre-set region 61 by the light converging element 321 without specially setting an orientation of the direction control element 32.

For example, as shown in FIG. 16, the light converging element 321 may be correspondingly provided with a plurality of collimating elements 322. For example, the collimating element 322 is a collimating lens, the collimating lens includes a convex lens, a concave lens, a Fresnel lens, or one or more of the above lens combinations, and the lens combination may specifically be a combination of a convex lens and a concave lens, a combination of a Fresnel lens and a concave lens, etc.; or the collimating element 322 is a collimating film, which is configured to adjust an exit direction of light to a pre-set angle range, and one collimating element 322 may collimate light emitted by a plurality of or even all light sources 31. For example, a distance between the collimating element 322 and a position of the light source is a focal length of the collimating element 322, and the light source may be arranged at a focal point of the collimating element 322.

For example, as shown in FIG. 2 and FIG. 16, the direction control element 32 further includes a reflective element 35; and the reflective element 35 is configured to reflect incident light emitted by the light source to the diffusing element 33.

For example, in some embodiments, the reflective element 35 includes a light cup. With respect to a structure of the direction control element 32, the light source device, the light cup and the light converging element may be arranged sequentially; and it may be considered that, light emitted by the light source device firstly passes through the light cup and then is transmitted to the light converging element.

For example, in some embodiments, the collimating element may be arranged between the light converging element and the light source device, or may also be arranged inside the light cup, or may also be arranged outside the light cup; the collimating element collimates at least a portion of light emitted by the light source device; and the collimated light is transmitted to the light converging element.

For example, the light cup is a housing, for example, a hollow housing, surrounded by a reflective surface. For example, a direction of an opening of the light cup faces the diffusing element 33; and a bottom portion of the light cup away from the opening is configured to arrange the light source corresponding to the light cup. For example, an inner wall of the light cup (e.g., an inner wall of a groove of the reflective element 35) is the reflective surface of the light cup. The reflective surface can reflect at least a portion of light with a relatively large angle emitted by the light source, and the reflected light can be converged, which can improve the utilization rate of the light emitted by the light source.

For example, a shape of the reflective surface of the hollow housing includes at least one of a curved surface shape (e.g., a parabolic shape), a free-form surface shape, a quadrangular pyramid shape, etc. For example, shapes of the opening and the end portion of the light cup include a circle, an ellipse, a quadrangle, etc.; and the shapes of the opening and the end portion may be the same or different.

For example, the direction control element 32 may also include a collimating element 322; in some examples, the collimating element 322 may be arranged inside the light cup, a size of the collimating element 322 is less than or equal to a size of the opening of the light cup; and the collimating element 322 is configured to collimate a portion of the light emitted by the light source inside the light cup and then emit the light to the diffusing element 33.

Or, in other embodiments, the light cup is a light cup with solid center, and the light cup with solid center includes a transparent part with solid center, for example, the light cup is a transparent part with solid center having a reflective surface 351, and a refractive index of the transparent part with solid center is greater than 1; a light exit opening of the light cup with solid center faces the diffusing element 33; the "facing" here includes facing directly (without any other elements arranged in the middle) and facing indirectly (with other elements arranged in the middle). An end portion of the light cup with solid center away from the opening is configured to arrange a light source corresponding to the light cup with solid center, so that total reflection occurs in a case that at least part of the light emitted by the light source is incident to the surface of the light cup with solid center. For example, FIG. 17 and FIG. 18 may be referred to for a specific structure of the light cup with solid center. For example, the light exit opening of the light cup with solid center refers to a direction of the opening of the reflective surface 351 of the light cup with solid center. For example, the surface of the light cup with solid center may be an interface between the transparent part with solid center and the outside (e.g., air); and when light irradiates to the outside, at least a portion of light that satisfies a total reflection angle can be totally reflected at the interface.

For example, a surface shape of the light cup with solid center includes at least one of a curved surface shape (e.g., a parabolic shape), a free-form surface shape and the like.

Figure 17:
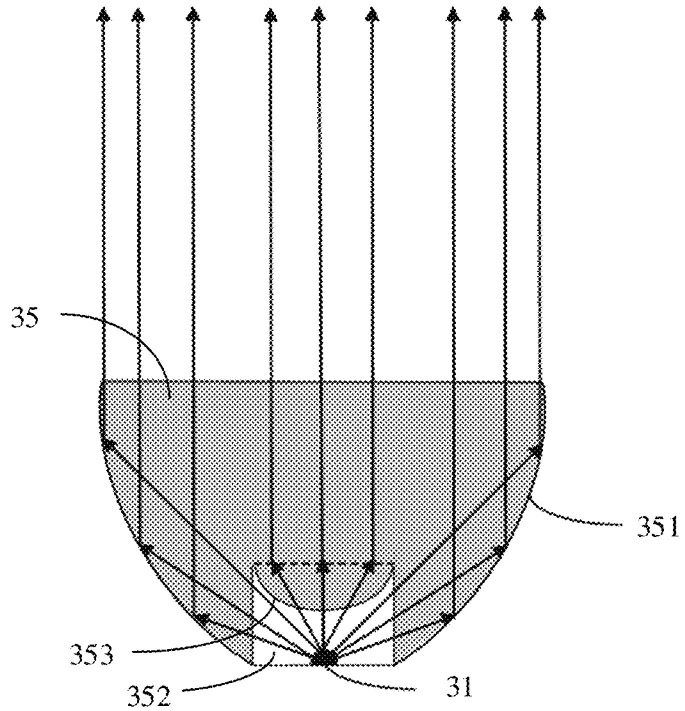
FIG. 17 shows a first structural schematic diagram of a light cup with solid center in a head up display system provided by at least one embodiment of the present disclosure.
Figure 18:
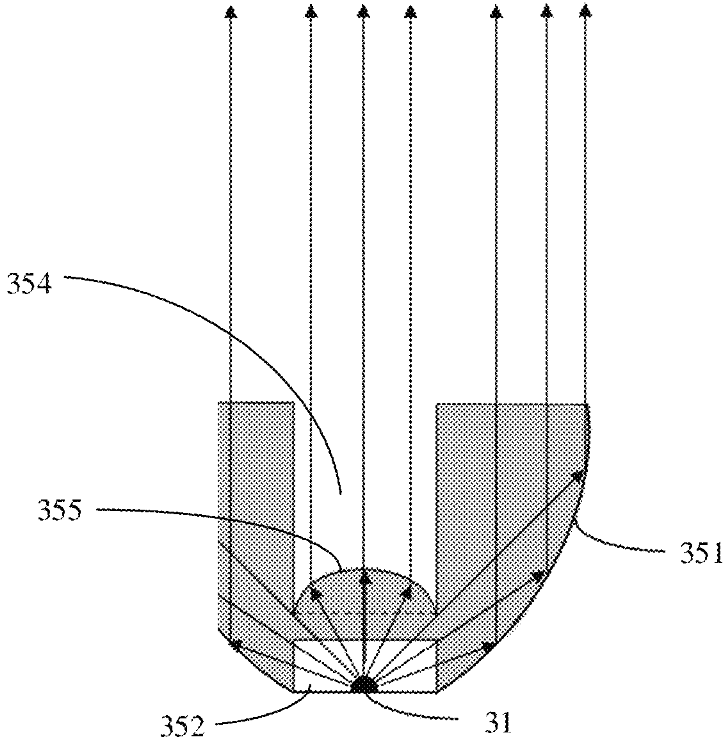
FIG. 18 shows a second structural schematic diagram of a light cup with solid center in a head up display system provided by at least one embodiment of the present disclosure.

For example, the collimating element 322 may be integrated on the light cup with solid center. The light cup with solid center is provided with a cavity at the end portion; and a side of the cavity close to the light exit opening of the light cup with solid center is a convex surface protruding toward the end portion. Referring to FIG. 17, the transparent part with solid center is provided with a cavity 352 at the end portion away from the opening of the light cup with solid center, and a side of the cavity 352 close to the opening of the light cup with solid center is a convex surface 353. Or, the light cup with solid center is provided with a hole at the light exit opening, and a bottom face of the hole is a convex surface that protrudes toward the light exit opening; as shown in FIG. 18, the transparent part with solid center is provided with a slot 354 in a middle position of the end portion close to the opening of the light cup with solid center (an example of the above-described hole); and a bottom face of the slot 354 is a convex surface 355.

For example, in some embodiments of the present disclosure, light emitted by the light source irradiates to a reflective surface (e.g., a hollow housing) or a surface (e.g., a transparent part with solid center) of the light cup, and is subjected to at least one of reflection and total reflection; and by controlling a shape (e.g., a parabolic shape) of the reflective surface or the surface, the reflected light is also adjusted to be collimated or nearly collimated light, which improves a collimation effect.

In some embodiments of the present disclosure, the convex surface 353 of the cavity 352 or the convex surface 355 of the slot 354 may both be configured to collimate light emitted by the light source; for example, the convex surface 353 or the convex surface 355 is equivalent to the collimating element 322. The convex surface 353 or the convex surface 355 is arranged in a middle position of the transparent part with solid center, a size of the convex surface 353 or the convex surface 355 is less than an opening size of the light cup with solid center; and the convex surface 353 or the convex surface 355 is configured to collimate a portion of light emitted by the light source inside the light cup with solid center, and then emit the light to the diffusing element 33. As shown in FIG. 17, the convex surface 353 is arranged in the cavity at the rear end of the light cup with solid center; and the convex surface 353 may form a convex lens to collimate light irradiating to the convex surface 353. Or, as shown in FIG. 18, the slot 354 is provided in the middle position of the transparent part with solid center; the bottom face of the slot 354 is the convex surface 355; the convex surface 355 of the light cup with solid center is configured to collimate light that cannot be reflected by the reflective surface 351 of the light cup with solid center; and other light with a larger emergent angle is at least totally reflected in the light cup with solid center, then collimated and emergent from the light cup with solid center. For example, the light cup with solid center is made of a transparent material with a refractive index greater than 1, for example, a polymer transparent material, glass, etc., to implement total reflection.

For example, in the embodiments of the present disclosure, the concave reflective element 20 is not in the optical path (the propagation path) of the light emitted from the light source device to the reflective imaging part 50.

In some embodiments, as shown in FIGS. 19A-21B, the direction control element 32 includes at least one transparent part 323, the transparent part 323 includes a light incident surface 324 and a light exit surface 325, the light source device includes a plurality of light sources 31, and light emitted by a light source 31 corresponding to the transparent part 323 enters the transparent part 323 from the light incident surface 324 and exits from the light exit surface 325, the transparent part 323 is configured to make a divergence angle of the light emitted from the light exit surface 325 smaller than a divergence angle of the light incident to the light incident surface 324.

The divergence angle of the exit light emitted from the light exit surface 325 is the included angle between the exit light and the main optical axis of the light emitted by the light source 31, and the divergence angle of the incident light incident to the light incident surface 324 is the included angle between the incident light and the main optical axis of the light emitted by the light source 31.

In some embodiments, the transparent part 323 includes a convex lens, a concave lens, a Fresnel lens, or one or more of the above lens combinations, which may be a combination of a convex lens and a concave lens, a combination of a Fresnel lens and a concave lens, etc.

Figure 21A:
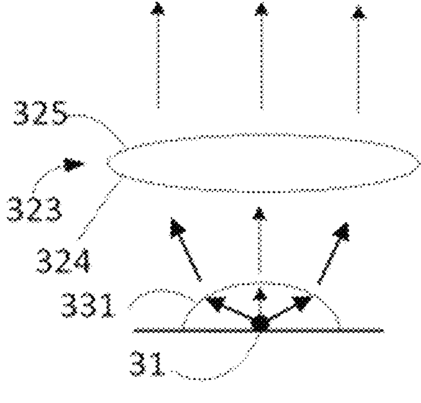
FIG. 21A shows a fifth structural schematic diagram of a direction control element in a head up display system provided by at least one embodiment of the present disclosure.

For example, as shown in FIGS. 19A and 21A, the transparent part 323 is a convex lens.

Figure 19B:
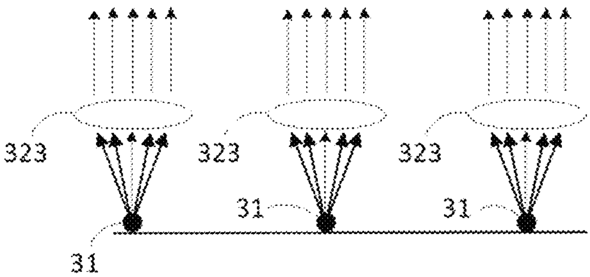
FIG. 19B shows a second structural schematic diagram of a direction control element in a head up display system provided by at least one embodiment of the present disclosure.

In some embodiments, the plurality of light sources 31 and their corresponding transparent parts 323 may be arranged as shown in FIG. 19B, and the plurality of light sources 31 may be arranged on a substrate.

Figure 20A:
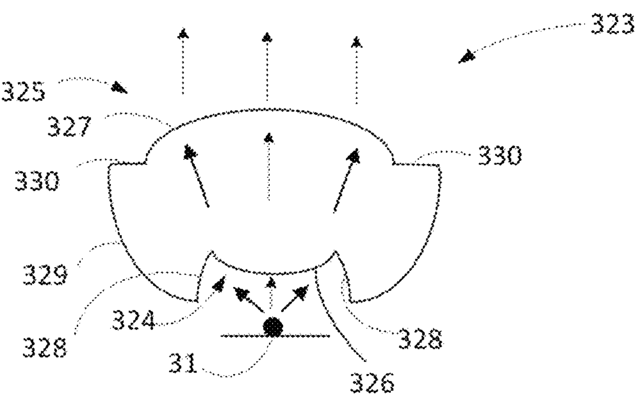
FIG. 20A shows a third structural schematic diagram of a direction control element in a head up display system provided by at least one embodiment of the present disclosure.

In some embodiments, as shown in FIG. 20A, the light incident surface includes a first light incident sub-surface 326 with a protrusion direction towards the light source, and/or the light exit surface comprises a first light exit sub-surface 327 with a protrusion direction away from the light source.

In some embodiments, in a case that the light incident surface includes the first light incident sub-surface 326 with a protrusion direction towards the light source, the light exit surface may be a plane surface; in a case that the light exit surface includes the first light exit sub-surface 327 with a protrusion direction away from the light source, the light incident surface may be a plane surface.

As shown in FIG. 20A, the light incident surface further includes a second light incident sub-surface 328 connected with the first light incident sub-surface 326, and the transparent part 323 further includes a side surface connecting the second light incident sub-surface 328 with the light exit surface 325, part of the light emitted by the light source 31 enters the transparent part 323 from the second light incident sub-surface 328, then is reflected by the side surface 329 (for example, total reflection occurs at the side surface 329), and exits from the light exit surface 325; and/or the light exit surface 325 further includes a second light exit sub-surface 330 connected with the first light exit sub-surface 327, and the transparent part 323 further includes a side surface 329 connecting the second light exit sub-surface 330 with the light incident surface 324, part of the light emitted by the light source 31 enters the transparent part 323, then is reflected by the side surface 329, and is emitted from the second light exit sub-surface 330.

Figure 20B:
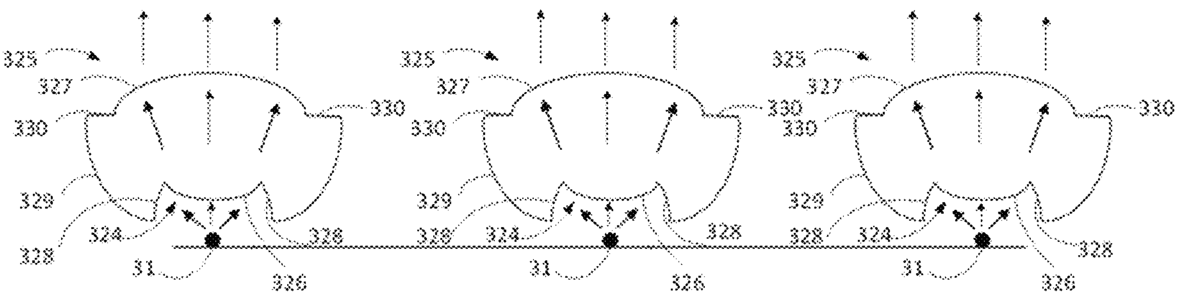
FIG. 20B shows a fourth structural schematic diagram of a direction control element in a head up display system provided by at least one embodiment of the present disclosure.

In some embodiments, the plurality of light sources 31 and their corresponding transparent parts 323 may be arranged as shown in FIG. 20B, and the plurality of light sources 31 may be arranged on a substrate.

In some embodiments, the at least one transparent part 323 is in a transparent part layer, the plurality of light sources 31 are in a light source layer, and a region between the light source layer and the transparent part layer is a gas medium layer. The gas medium layer is a continuous gas medium layer, or only a gas medium, or no inclined or vertical reflecting element is provided.

In some embodiments, as shown in FIG. 21A, the direction control element further includes a plurality of light converging elements 331, light emitted by a light source corresponding to the light converging element 331 passes through the transparent part 323 after passing through the light converging element 331, the at least one transparent part 323 is in a transparent part layer, the plurality of light converging elements 331 are in a light converging layer, and a region between the light converging element layer and the transparent part layer is a gas medium layer. The gas medium layer is a continuous gas medium layer, or only a gas medium, or no inclined or vertical reflecting element is provided.

Figure 21B:
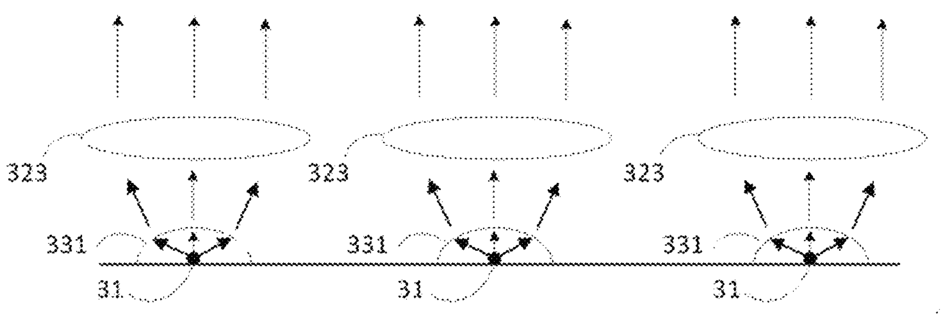
FIG. 21B shows a sixth structural schematic diagram of a direction control element in a head up display system provided by at least one embodiment of the present disclosure.

In some embodiments, the plurality of light sources 31 and their corresponding transparent parts 323 and light converging elements 331 can be arranged as shown in FIG. 21B, and the plurality of light sources 31 can be arranged on a base substrate.

In some embodiments, the light source 31 may be embedded in the light converging elements 331.

Through the above embodiments, the uniformity of the emitted light at the light exit surface can be improved, and therefore the image quality of the virtual image is improved, and at the same time, it is conducive to the heat dissipation of the light source.

In some embodiments, the single-layer imaging device may include a backlight assembly, the backlight assembly may include a light source part and a direction control part, the light source part may adopt the light source 31/the light source device as shown in FIGS. 19A-21B, and the direction control part may adopt the direction control element 32 as shown in figure FIGS. 19A-21B.

Figure 22A:
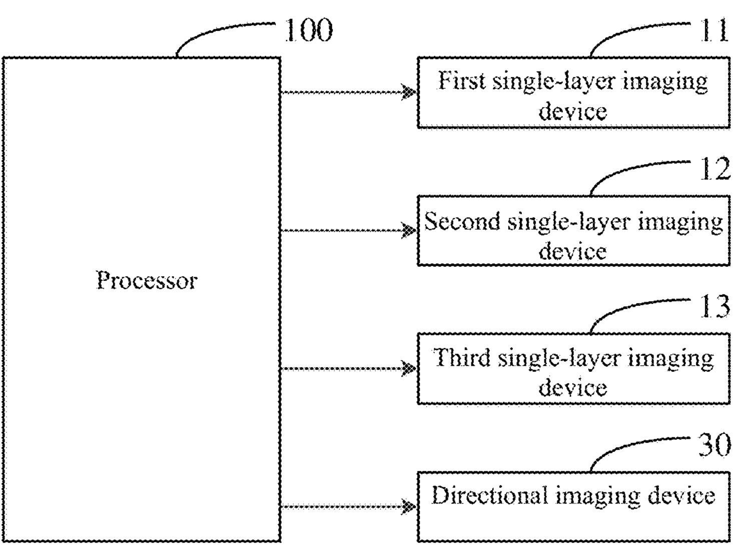
FIG. 22A shows a structural block diagram of a head up display system provided by at least one embodiment of the present disclosure.
Figure 22B:
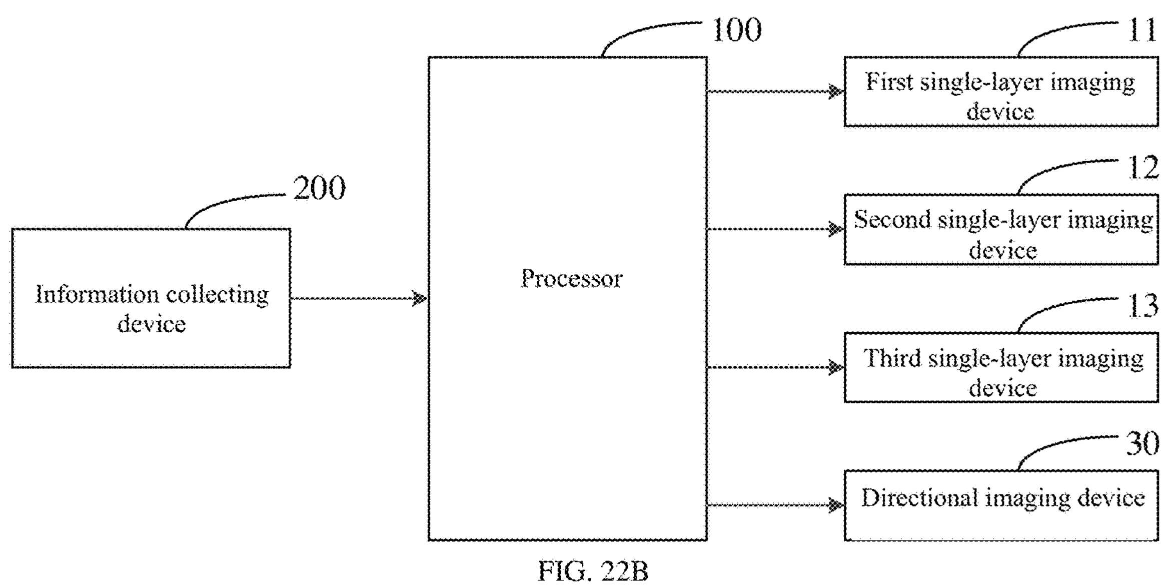
FIG. 22B shows another structural block diagram of a head up display system provided by at least one embodiment of the present disclosure.

For example, on the basis of any one of the above-described embodiments, as shown in FIG. 22B, the head up display system further includes an information collecting device 200; the information collecting device 200 is communicatively connected with the processor 100, for example, connected in a wired or wireless manner; and the information collecting device 200 is configured to collect local information and surrounding information, and send the collected local information and surrounding information to the processor 100. For example, the processor 100 may be configured to: acquire the local information and the surrounding information, and generate target information according to the local information and the current surrounding information.

In the embodiments of the present disclosure, the information collecting device 200 may collect local information related to a current driving state of the vehicle or related to the driver, or may also collect current surrounding information around the external environment of the vehicle, so that the processor 100 can generate corresponding target information based on the local information and the current surrounding information. For example, the information collecting device may specifically include one or more selected from the group consisting of an image collecting device, a radar (e.g., an on-board radar), an infrared sensor, a laser sensor, an ultrasonic sensor, a rotational speed sensor, an angular velocity sensor, a global positioning system (GPS), a vehicle to X (V2X, representing vehicle-to-external information exchange) system, and an advanced driving assistant system (ADAS). For example, different information collecting devices may be mounted at different positions based on requirements thereof, and no details will be repeated here.

For example, on the basis of the above-described embodiments, the head up display system provided by the embodiments of the present disclosure may be arranged on a vehicle, and the to-be-displayed target information is determined based on a speed of the vehicle. For example, the local information collected by the information collecting device includes local speed information, the local speed information may represent the speed of the vehicle; for example, the information collecting device may also monitor an object outside the vehicle, for example, the external object, and determine a distance between a reference object (e.g., the vehicle, for example, the motor vehicle) and the external object. For example, the information collecting device may include a speed sensor, or a rotational speed sensor arranged on a wheel, to further determine corresponding local speed information; or, in a case that the vehicle is a motor vehicle, vehicle speed information of the vehicle may also be read by a data transmission system, such as an on-board diagnostics (OBD) system, to further determine the local speed information; or, the vehicle speed is measured by a built-in vehicle speed measurement function of an auxiliary device provided inside the vehicle, for example, the auxiliary device is a driving recorder, an electronic dog, a smart phone, etc., to further determine the local speed information of the vehicle. For example, the information collecting device may further include an image collecting device, an on-board radar, or a distance sensor (e.g., an infrared distance sensor, a laser distance sensor, an ultrasonic distance sensor, etc.), etc., so as to determine a current distance between the external object and the vehicle.

Figure 23:
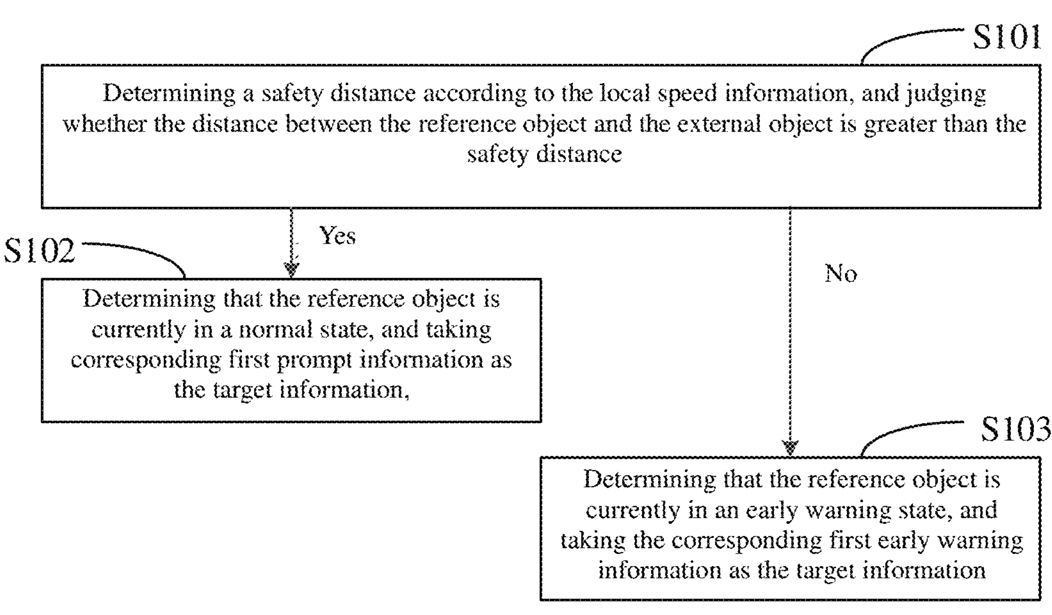
FIG. 23 shows a flow chart of assisted driving based on a safety distance by a processor provided by at least one embodiment of the present disclosure.

For example, in some embodiments, after the processor 100 acquires the local speed information and the distance between the reference object and the external object, as shown in FIG. 23, the processor 100 generates the target information according to the local information and the surrounding information, including:

Step S101: determining a safety distance according to the local speed information, and judging whether the distance between the reference object and the external object is greater than the safety distance.

In the embodiments of the present disclosure, the safety distance is a critical value of the safety distance when the vehicle is running; correspondence between the vehicle speed and the safety distance may be pre-set; and based on the correspondence, the current local speed information may be mapped to the corresponding safety distance. For example, when the vehicle speed v≥60 km/h, the safety distance S is numerically equal to the vehicle speed v; if the vehicle speed is 110 km/h, the safety distance S may be 110 meters; when 40 km/h≤vehicle speed v≤60 km/h, the safety distance S=50 m; when 20 km/h≤vehicle speed v≤40 km/h, the safety distance S=30 m; when the vehicle speed v≤20 km/h, the safety distance S=15 m, and so on. Other correspondence may also be used, which is not limited in the embodiments of the present disclosure. In addition, the external object in the embodiments of the present disclosure may include other vehicles, pedestrians, animals, non-motor vehicles, and the like outside the vehicle, or may also include a stationary object such as roads and indicators, etc. With respect to different external objects, different correspondences may be adopted to determine the safety distance.

Step S102: in a case that the distance between the reference object and the external object is greater than the safety distance, determining that the reference object is currently in a normal state, and taking corresponding first prompt information as the target information, in which the first prompt information includes one or more selected from the group consisting of an empty set, a first prompt image and a first prompt video.

In the embodiments of the present disclosure, if the distance between the reference object (e.g., the vehicle) and the external object is greater than the safety distance, it indicates that the external object is far away from the vehicle, and it is relatively safe at this time, for example, the vehicle may be regarded as being in a normal state, in this case, the first prompt information that mainly plays a prompting role may be taken as the target information. The first prompt information may be an empty set, for example, if the target information is empty, the head up display system may not display any information; or, the first prompt information may be a first prompt text, for example "Safety distance, please continue", etc.; the first prompt information may also be a first prompt image, for example, a light-colored image, etc.; or the first prompt information may also be a first prompt video, for example, an applause animation, etc.

In the embodiments of the present disclosure, content in the prompt image or the prompt video may be at least one of texts, graphics, symbols, animations, pictures, and so on.

Step S103: in a case that the distance between the reference object and the external object is not greater than the safety distance, determining that the reference object is currently in an early warning state, and taking the corresponding first early warning information as the target information, in which the first early warning information includes one or more selected from the group consisting of a first early warning image and a first early warning video.

In the embodiments of the present disclosure, if the distance between the external object and the vehicle is not greater than the safety distance, it indicates that the external object is relatively close to the vehicle, and there is a high risk of a traffic accident in this case, so this may be taken as an early warning state, and further the first early warning information to be displayed in the early warning state may be displayed as the target information. For example, the first early warning information may include a first early warning text, for example, "Too close to the front vehicle, please slow down"; the first early warning information may also include a first early warning image, for example, a graphic of a red exclamation mark is displayed, or a graphic matching the external object is highlighted at a position corresponding to the external object (e.g., a target position); and the first early warning information may also include a first early warning video, for example, an animation showing two vehicles colliding.

In the embodiments of the present disclosure, content in the early warning image or the early warning video may be at least one of texts, graphics, symbols, animations, pictures, and so on. "Not greater than" may be "less than or equal to", or may be "less than".

For example, the safety distance in the embodiments of the present disclosure may include one or more selected from the group consisting of a front safety distance, a rear safety distance, and a side safety distance. If the external object is located in front of the reference object, and the distance between the reference object and the external object is not greater than the front safety distance, it may be determined that the reference object is currently in an early warning state; if the external object is located on a lateral side of the reference object, and the distance between the reference object and the external object is not greater than the side safety distance, it is determined that the reference object is currently in the early warning state; if the external object is located behind the reference object, and the distance between the reference object and the external object is not greater than the rear safety distance, it may be determined that the reference object is currently in the early warning state. For example, appropriate first early warning information may be taken as the target information in a corresponding situation, for example, if the external object on the right side is close to the vehicle, "Please keep distance from the vehicle on the right", etc. may be taken as the target information.

For example, while determining the target information, the processor 100 may also determine the corresponding target position, and determine an imaging device, for example, the target imaging device, that needs to display the target information, and further display the target information at the target position on the reflective imaging part 50 through the target imaging device. According to the above-described other embodiments, the target position may be pre-set, or may also be determined based on the projection position of the external object on the reflective imaging part 50, so as to implement fitting display.

For example, when the reference object is in different states, for example, in an early warning state or a normal state, different display modes may be used to display the target information. For example, in the case that the reference object is currently in the early warning state, the processor 100 may control the target imaging device to display the target information in a normal mode or a first highlighting display mode, the first highlighting display mode includes one or more selected from the group consisting of dynamic display (e.g., scrolling display, jumping display, flashing display), highlighting display, and display in a first color. In the case that the reference object is currently in the normal state, the processor 100 may control the target imaging device to display the target information in a normal mode or a second highlighting display mode, the second highlighting display mode includes display in a second color.

In the embodiments of the present disclosure, in the case that the reference object is in an early warning state or a normal state, the target information may be displayed in a same mode (e.g., a normal mode); the displayed target information in different states is different; and the normal mode includes one or more selected from the group consisting of static display, scrolling display, jumping display, flashing display, highlight display, etc.

Or, in different states, not only the displayed target information is different, but also the display mode may be different. For example, in the early warning state, "Too close to the vehicle ahead, please slow down" may be displayed in the first color (e.g., red); in the normal state, the head up display system may display "Currently safe, please continue" in a second color (e.g., green). Or, in different states, same target information may also be displayed in different display modes. For example, the external object is a pedestrian, and the head up display system currently needs to mark the pedestrian in an AR mode, for example, use a rectangle frame to mark a position where the pedestrian is located; if it is currently in an early warning state, the rectangle frame may be displayed in the first color (e.g., red), for example, a red rectangular frame is displayed; if it is currently in a normal state, the rectangular frame may be displayed in the second color (e.g., green), for example, a green rectangular frame is displayed.

For example, in the embodiments of the present disclosure, the state of the vehicle may be determined in real time, so that the target information may be displayed in different display modes in real time or at intervals (i.e., at predetermined intervals, for example, intervals of 10 ms or 20 ms, etc.). For example, if the reference object is currently in an early warning state, the target information of "Please slow down" is displayed in red; then the driver adjusts the distance between the reference object and the external object by decelerating, etc., so that the external object is located outside the safety distance, for example, and thereafter, it is in a normal state; in this case, target information such as "Safe driving currently" may be displayed in green.

Figure 24:
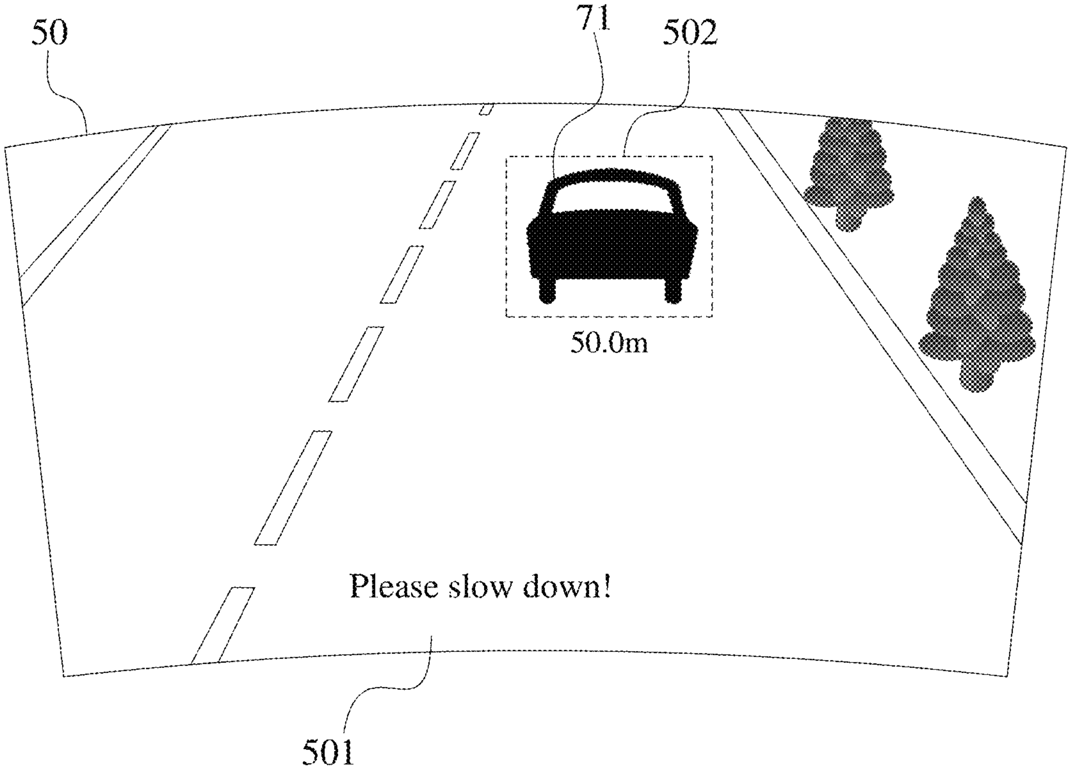
FIG. 24 shows a schematic diagram of a reflective imaging part displaying a picture when a distance between vehicles is relatively short according to at least one embodiment of the present disclosure.

FIG. 24 schematically shows a display mode by taking the external object as a vehicle, when the vehicle is too close to the local vehicle. As shown in FIG. 24, the head up display system detects that a current distance between a front vehicle 71 and the local vehicle is 50 m, and a current safety distance is 60 m, for example, in this case, it is in an early warning state, the target information that may be displayed by the head up display system on the reflective imaging part 50 (e.g., the windshield of the local vehicle) includes an early warning text 501, for example, "Please slow down", and the target information further includes a rectangular frame 502 for frame-selecting the front vehicle 501, the rectangular frame 502 may specifically be displayed in red or highlighted, etc., to enhance a prompt effect. For example, the distance to the front vehicle 71 (e.g., the currently detected target distance) may also be displayed at the same time, and the distance "50.0 m" is displayed below the rectangular frame 502 in FIG. 24.

For example, in a driving process, if the external object is a front vehicle (e.g., the external object is a vehicle and is located in front of the local vehicle), a vehicle speed and a separation distance, etc. of the front vehicle may be displayed in a fitting manner. For example, the information collecting device may include a speed sensor, a distance sensor, etc.; based on the information collecting device, current surrounding information containing front information may be acquired, and the front information specifically includes the vehicle speed of the front vehicle and/or a current distance to the front vehicle. For example, the processor 100 may be configured to take a projection position where a target region of the front vehicle is projected on the reflective imaging part as the target position, take the front information as the target information, and control the target imaging device to display the target information at the target position; for example, the target region of the front vehicle is a blank region between rear wheels of the front vehicle or a region where a trunk is located.

In the embodiments of the present disclosure, in the case that the external object is a front vehicle, the region where the trunk of the front vehicle is located or the blank region between two rear wheels may be taken as the target region; and based on the head up display system, information that fits the target region may be displayed on the reflective imaging part 50. For example, the vehicle speed of the front vehicle, or the distance to the local vehicle may be displayed in the blank region between the two rear wheels of the front vehicle, so that the driver can intuitively and accurately determine relevant information of the front vehicle in real time, and further make corresponding operation reactions based on the front information of the front vehicle.

In the embodiments of the present disclosure, in the case that the reference object is currently in an early warning state, other prompt modes may also be used to perform auxiliary prompts. For example, the head up display system may further include a sounding device or a vibrating device, and the processor 100 may further be configured to: send an early warning voice to the sounding device, and control the sounding device to play the early warning voice; and/or, send a vibration signal to the vibrating device, and control the vibrating device to vibrate; for example, the vibrating device may be arranged at a position that may get into contact with the user during use. In the embodiments of the present disclosure, a speaker may be added to the head up display system, or a voice prompt may be performed by means of a speaker on the vehicle; the early warning voice may be an early warning ringtone without any specific meaning, or may also be a specific voice, for example, "Attention! Keep distance!" etc. For example, a mechanical vibrating device may be mounted at a position that may get into direct contact with the driver, for example, a steering wheel or a seat of the vehicle, so as to prompt the driver in the early warning state by vibration.

For example, in a possible implementation mode, regardless of the current state of the reference object, relevant information of the external object may also be displayed in real time (or at intervals). For example, the information collecting device 200 may include an image collecting device, an on-board radar, or a distance sensor (e.g., an infrared distance sensor, a laser distance sensor, an ultrasonic distance sensor, etc.), etc.; while determining the distance between the reference object and the external object (e.g., the target distance), a position of the external object is also determined, and the surrounding information may include the position of the external object and the distance between the reference object and the external object. For example, the processor 100 may be configured to take the position of the external object and the distance between the reference object and the external object as the target information, so that the target information may be displayed on the reflective imaging part 50 in real time, to further prompt the driver in real time of the position, and the distance, etc. of the external object.

Or, the position of the external object may also be intuitively marked in an AR display mode. For example, the processor 100 may further be configured to determine the projection position where the external object is projected (or mapped) to the reflective imaging part, take the projection position or the edge of the projection position as the target position, and control the target imaging device to display the pre-set target information at the target position. In the embodiments of the present disclosure, by setting the projection position of the external object as the target position, the target information consistent with the external object may be displayed at the corresponding position of the reflective imaging part 50, so that the external object may be intuitively marked for the driver. For example, if the external object is a vehicle, for example, a frame may be displayed at the corresponding position of the windshield, and the frame can frame the vehicle.

Figure 25:
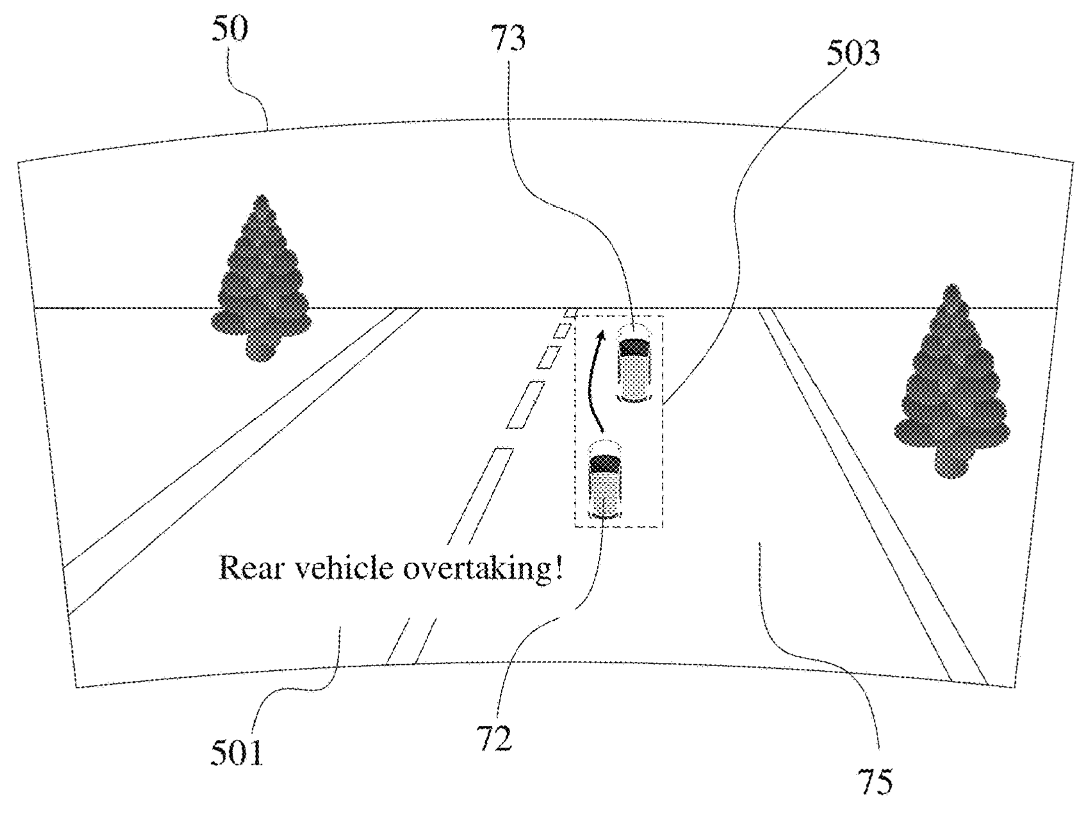
FIG. 25 shows a schematic diagram of a reflective imaging part displaying an aerial view according to at least one embodiment of the present disclosure.

For example, the head up display system takes, in real time, some information that may be displayed all the time as the target information, and displays the information at a pre-set position of the reflective imaging part 50. For example, positions and distances of all external objects around the vehicle may be monitored in real time, and an aerial view of the vehicle may be generated; positions of external objects in respective directions, that is, front, back, left and right, of the vehicle may be schematically represented in the aerial view, to facilitate the driver to quickly view surrounding environment; for example, the surrounding external objects may also be displayed in different colors to indicate different levels of danger. Referring to FIG. 25, situations of other vehicles around the local vehicle 73 may be displayed on the reflective imaging part 50 in a form of an aerial view, for example, an aerial view 503 shows that a rear vehicle 72 at the rear left side of the local vehicle 73 is about to overtake, and an early warning 501 text, for example, "Rear vehicle overtaking", may be displayed.

On the basis of the above-described embodiments, if the external object is a pedestrian, a non-motor vehicle, etc., it generally has a higher safety priority; for example, the vehicle needs to give priority to a position of a pedestrian, etc. during a driving process to avoid collision; so that a prompt is given priority when the external object is a pedestrian, a non-motor vehicle, etc. In the embodiments of the present disclosure, the processor 100 may be further configured to: in a case that the external object is a key object, determine that the reference object is currently in an early warning state, and take corresponding second early warning information as the target information, in which the second early warning information may include one or more selected from the group consisting of a second early warning image and a second early warning video.

For example, in a case that the distance between the reference object and the external object is less than a pre-set distance value, and the external object is a pedestrian, an animal, or a non-motor vehicle, the external object is regarded as the key object. Or, in a case that the external object moves toward a current driving line, and the external object is a pedestrian, an animal or a non-motor vehicle, the external object is regarded as the key object. Or, in a case that the external object is located in the current driving line, and the external object is a pedestrian, an animal, or a non-motor vehicle, the external object is regarded as the key object. Or, in a case that the vehicle is currently located in an object-intensive region, and the external objects are pedestrians, animals or non-motor vehicles, the external objects are regarded as key objects; the object-intensive region includes one or more selected from the group consisting of a school, a hospital, a parking lot, and an urban district. Or, the local information includes the driver's line-of-sight azimuth information; in a case that the line-of-sight azimuth information does not match a current position of the external object, and the external object is a pedestrian, an animal or a non-motor vehicle, the external object is taken as the key object.

In the embodiments of the present disclosure, in a case that the external object is something that needs special attention, such as a pedestrian, an animal, or a non-motor vehicle, it may be judged whether the external object may be taken as the key object. For example, if the distance between the reference object and the external object is less than a pre-set distance value, it indicates that the external object is close to the vehicle, which may also be taken as an early warning state; for example, the pre-set distance value may be a distance value that is set in advance, for example, it may be the "safety distance" determined based on the vehicle speed according to the above-described embodiments. If the external object is moving towards the current driving line, or the external object is located in the current driving line of the vehicle, it indicates that the vehicle and the external object are more likely to collide, which may be taken as an early warning state. Or, based on GPS, etc., when the external object is determined to be located in a densely populated region, such as a school or a hospital, there will generally be a large number of pedestrians, in this case, an early warning state may be set to prompt the driver. Or, the information collecting device may also include an image collecting device, an infrared sensor, etc.; the driver's line-of-sight azimuth information, for example, the driver's binocular position, line-of-sight position, etc. is determined based on the information collecting device; if the line-of-sight azimuth information does not match a current position of the external object, it indicates that the driver is most likely not paying attention to the external object, so that an early warning state may be set to prompt the driver. For example, the information collecting device may determine the line-of-sight azimuth information specifically based on an eye tracking technology, or other technologies, which is not limited here.

Figure 26:
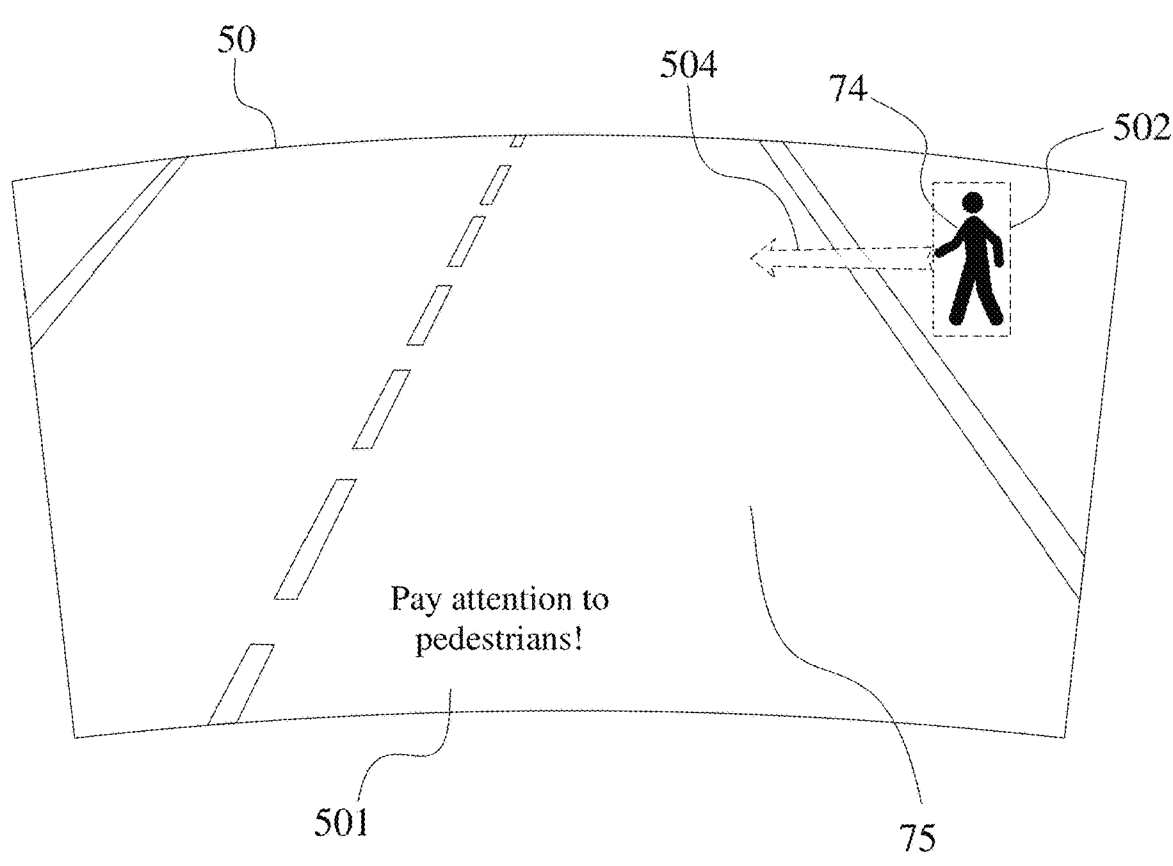
FIG. 26 shows a schematic diagram of a reflective imaging part displaying a picture when a pedestrian is approaching according to at least one embodiment of the present disclosure.

In the embodiments of the present disclosure, in the case that an early warning state is determined, second early warning information for prompting the driver may be generated, for example, "A pedestrian ahead, pay attention to avoid", "A school ahead, pay attention to pedestrians", etc.; and the second early warning information is taken as the target information. As shown in FIG. 26, in a case that a pedestrian 74 is detected ahead, the head up display system may display an early warning text 501, for example, "Pay attention to pedestrians", on the reflective imaging part 50, or may highlight and frame the pedestrian 74 with a rectangular frame 502, and prompt the driver that a pedestrian is currently moving toward the current driving lane 75 through an arrow 504 that may represent a movement trend of the pedestrian 74. For example, the target information may be displayed in a normal mode or in a first highlighting display mode, or an auxiliary prompt may be performed by means of a voice prompt, which is basically similar to the above-described embodiment, and no details will be repeated here.

For example, the "safety distance" in the above-described embodiments may further include a front safety distance; and the front safety distance refers to a safety distance between a reference object, for example, the vehicle and an external object located in front. The processor 100 may further be configured to: in a case that the external object is located in front of the reference object, the distance between the reference object and the external object is not greater than the front safety distance, and a difference between the safety distance and the distance between the reference object and the external object is greater than a pre-set distance difference and/or a duration of the early warning state exceeds a pre-set duration, generate a brake signal or a deceleration signal, and output the brake signal or the deceleration signal, for example, to a driving system of the vehicle.

In the embodiments of the present disclosure, if the distance between the reference object and the external object is not greater than the front safety distance, the reference object currently may be in an early warning state; for example, if the distance difference between the front safety distance and the distance between the reference object and the external object is greater than the pre-set distance difference, or a duration that the reference object is in the early warning state exceeds the pre-set duration, it indicates that the external object is too close to the vehicle, or the distance between the two is in a dangerous range for a long time, the processor 100 may generate a brake signal or a deceleration signal, and send the brake signal or the deceleration signal to the driving system of the vehicle, to decelerate or brake the vehicle, so that a safety distance may be maintained between the vehicle and the external object.

On the basis of the above-described embodiments, in the case that the vehicle is a motor vehicle, the head up display system may further monitor whether the vehicle deviates from the lane; and in a case that the vehicle deviates from the lane, determine that there is a problem of lane deviation; and perform an early warning. For example, the information collecting device may include an image collecting device, a radar (e.g., an on-board radar), a GPS, etc.; a condition of the lane, for example, lane position information, in front of the vehicle may be determined based on the information collecting device, the lane position information may specifically include the lane in which the vehicle is currently located, an adjacent lane of the vehicle, etc.; based on the information collecting device, a position where the vehicle is located, for example, vehicle position information, can be determined. For example, the processor 100 may acquire the lane position information and the vehicle position information. Referring to FIG. 24, the processor 100 generates target information according to the local information and the surrounding information, which may include:

Step S201: according to the lane position information and the vehicle position information, determining a deviation parameter that the vehicle deviates from the current driving lane, and judging whether the deviation parameter is greater than a corresponding deviation threshold; in which the deviation parameter includes a deviation angle and/or a deviation distance.

In the embodiments of the present disclosure, based on the vehicle position and the lane position, it may be judged whether the vehicle is located in a proper lane, for example, it may be judged whether there is deviation. If the vehicle is located in a corresponding lane, the deviation parameter may be zero, and the deviation distance and the deviation angle may both be zero or one of them may be zero; if a driving direction of the vehicle is inconsistent with a lane direction, the corresponding deviation angle needs to be determined, for example, an angle at which the vehicle deviates from the lane; if the vehicle may deviate, for example, the vehicle presses the line, the corresponding deviation distance needs to be determined. Whether the vehicle currently deviates may be determined by comparing the deviation parameter with the pre-set deviation threshold.

Step S202: in a case that the deviation parameter is greater than the corresponding deviation threshold, determining that the reference object is currently in an early warning state, and taking corresponding third early warning information as the target information, in which the third early warning information includes one or more selected from the group consisting of a third early warning image, a third early warning video, and a priority driving lane.

In the embodiments of the present disclosure, if the current deviation parameter is greater than the deviation threshold, it indicates that the deviation angle is too large and/or the deviation distance is too large, which indicates that the vehicle has a risk of deviation, for example, the vehicle may be regarded as being in an early warning state, and the corresponding third early warning information is taken as the target information to prompt the driver. For example, the third early warning information includes a third early warning text, a third early warning image or a third early warning video related to lane deviation; and the current priority driving lane may also be marked, for example, the priority driving lane is taken as the target information. For example, the priority driving lane may be taken as an external object, and the corresponding target position may be determined by determining a projection position of the priority driving lane mapped on the reflective imaging part 50, for example, the projection position or the edge of the projection position is taken as the target position, and further the priority driving lane is displayed at the target position on the reflective imaging part 50. For example, a graphic such as an arrow, a trapezoid (corresponding to a priority driving lane for driving straight ahead), and a fan ring with a gradually decreasing width (corresponding to a priority driving lane that requires turning) may be displayed on the reflective imaging part 50. For example, a shape of the graphic displayed on the reflective imaging part 50 may be specifically determined based on an actual shape of the priority driving lane mapped on the reflective imaging part 50.

For example, in a case that the deviation parameter is greater than the corresponding deviation threshold, it may be directly determined that the vehicle is in an early warning state; or, in a case that the deviation parameter is greater than the corresponding deviation threshold, it is comprehensively determined, based on other local information, whether the vehicle currently deviates from the lane, for example, whether it may be regarded as an early warning state. For example, the information collecting device includes a speed sensor, an acceleration sensor, an angular velocity sensor, etc., which may be respectively used to collect the vehicle speed, vehicle acceleration, vehicle steering angle, etc.; and a turn signal state may be determined based on a system of the vehicle per se, for example, it may be determined whether the turn signal is in an ON state; for example, vehicle state information is generated based on information such as the vehicle speed, vehicle acceleration, turn signal state, etc., and the vehicle state information is sent to the processor 100 as a kind of local information; and the processor 100 determines whether it is an early warning state based on the current deviation parameter and the vehicle state information.

For example, in a case that the deviation parameter is greater than the corresponding deviation threshold and the early warning condition is satisfied, it is determined that the reference object is currently in the early warning state. For example, the early warning condition includes one or more selected from the group consisting of the cases that: the vehicle speed is greater than a first pre-set speed value, the vehicle acceleration is not greater than zero, a turn signal on a same side as a direction corresponding to the deviation angle of the vehicle is not in an ON state, the current state is an unchangeable lane state, and a duration of lane deviation is greater than a pre-set first deviation duration threshold.

In the embodiments of the present disclosure, if the deviation parameter is greater than the corresponding deviation threshold, it indicates that there is a risk of deviation, and then it is judged whether the deviation state is normal based on the vehicle state information, and if it is not normal, it may be taken as an early warning state. For example, if the vehicle speed is greater than the first pre-set speed value or the vehicle acceleration is not greater than zero, it indicates that the vehicle speed is too fast, or the vehicle still does not decelerate under the condition of deviate, which may be regarded as an early warning state in this case. Or, if the turn signal on a same side as a direction corresponding to deviation angle of the vehicle is not in an ON state, for example, the vehicle deviates to the left and the turn signal on the left side is not turned on, it may also be indirectly considered that the driver is not currently turning to the left normatively, there is also a greater risk, and it is an early warning state. Or, if it is currently in an unchangeable lane state, for example, in a case that there are other vehicles in the lane corresponding to the deviation direction, it is not allowed to change to the lane, and if the driver continues to change the lane in the deviation direction, it is easy to cause traffic accidents, which, thus, may also be regarded as an early warning state. Or, if duration of deviation from the lane is greater than the pre-set first deviation duration threshold, it may indicate that the vehicle has deviated from the lane for a long time, and the driver should be prompted.

For example, in a case that the deviation parameter is greater than the corresponding deviation threshold, some situations are normal deviation in which the driver may not be specially prompted, for example, it may be a normal state, or say it does not belong to a case where the vehicle deviates. For example, the local information collected by the information collecting device further includes vehicle state information; and the vehicle state information includes one or more selected from the group consisting of the vehicle speed, vehicle acceleration, turn signal state, double flashing signal state, and yaw rate. The processor 100 may, based on the vehicle state information, specifically make judgments below:

In a case that the deviation parameter is greater than the corresponding deviation threshold and the normal condition is satisfied, determining that the reference object is currently in an early warning state. The normal condition includes one or more selected from the group consisting of items below: the vehicle speed is less than the second pre-set speed value, the vehicle acceleration is less than zero, the turn signal on a same side as a direction corresponding to the deviation angle of the vehicle is in an ON state, the double flashing signal is in an ON state, the yaw rate is greater than the pre-set angular velocity threshold, the duration of deviation from the lane is less than the pre-set second deviation duration threshold, and the directions corresponding to the driver's line-of-sight azimuth information and the deviation angle are the same.

In the embodiments of the present disclosure, if the deviation parameter is greater than the corresponding deviation threshold, it indicates that there is a risk of deviation; but if it is determined based on the vehicle state information that the current deviation is the normal deviation (e.g., a normal lane change), etc., it may be taken as a normal state, and an early warning may not be performed. For example, if the vehicle speed is less than the second pre-set speed value or the vehicle acceleration is less than zero, it indicates that the vehicle speed is not fast or is decelerating, and in this case, the risk is small, which may be regarded as a normal state. If the turn signal on an opposite side of the direction corresponding to the deviation angle of the vehicle is in an ON state, it indicates that although the vehicle is currently deviating from the lane, the driver is turning in the same direction as the deviation direction, which may be normal lane changing or turning by the driver, and may be regarded as a normal state. If the double flashing signal is in an ON state, or the yaw rate is greater than the pre-set angular velocity threshold, it indicates that the vehicle needs to deviate or change lanes due to a fault, or the vehicle encounters an emergency situation that leads to emergency steering, avoidance, etc., which may not be regarded as a lane deviation situation that requires an early warning, for example, with respect to the lane deviation, it may also be taken as a normal state that does not belong to a lane deviation situation. For example, if the driver's line-of-sight azimuth information is the same as the direction corresponding to the deviation angle, it indicates that although the vehicle is currently deviating from the lane, the driver has noticed the deviation situation, which may also be regarded as a normal state, and no additional early warning is needed to prompt the driver.

Step S203: in a case that the deviation parameter is not greater than the corresponding deviation threshold, determining that the reference object is currently in a normal state, and taking the corresponding third prompt information as the target information, in which the third prompt information includes one or more selected from the group consisting of an empty set, a third prompt image, a third prompt image, a third prompt video, and a priority driving lane.

In the embodiments of the present disclosure, if the current deviation parameter is not greater than the deviation threshold, it indicates that the deviation distance is not great and/or the deviation angle is not great, for example, it indicates that the vehicle is running normally, the vehicle may be regarded as being in a normal state, and the corresponding third prompt information may be taken as the target information.

For example, similar to the above-described embodiments of determining the safety distance, in a case that the vehicle is in a different state such as an early warning state or a normal state, a different display mode may be used to display the target information, for example, in a case that the vehicle is currently in an early warning state, the processor 100 may be configured to control the target imaging device to display the target information in a normal mode or in a highlighting display mode, the first highlighting display mode includes one or more selected from the group consisting of dynamic display (e.g., scrolling display, jumping display, flashing display), highlighting display, and display in the first color. In a case that the reference object is currently in a normal state, the processor 100 may be configured to control the target imaging device to display the target information in a normal mode or in a second highlighting display mode, the second highlighting display mode includes display in a second color. The display mode in this embodiment is basically similar to the above-described embodiments, and no details will be repeated here.

Figure 27:
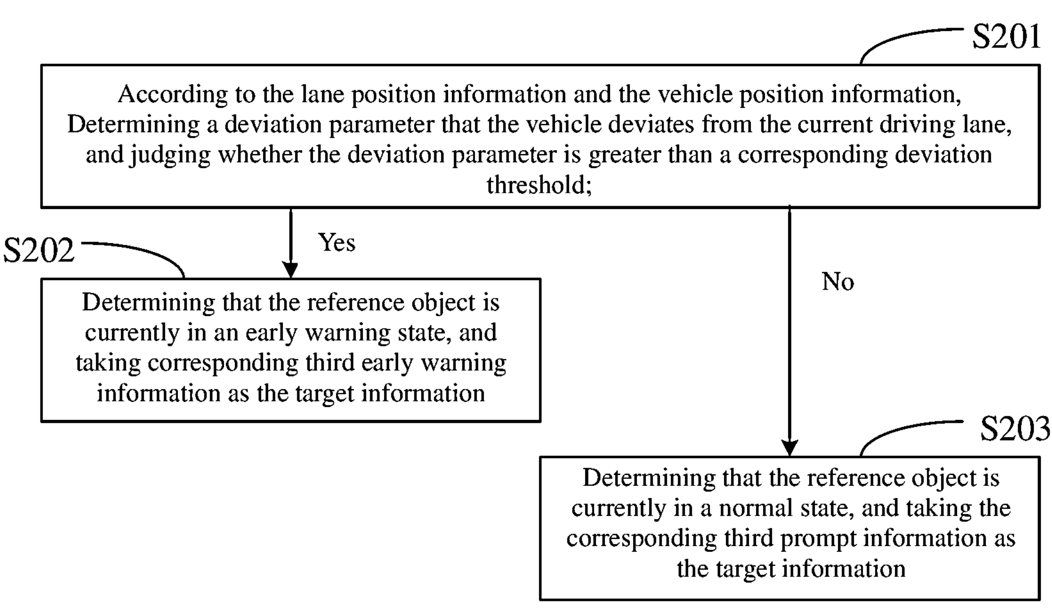
FIG. 27 shows a flow chart of determining whether there is deviation from a lane by a processor provided by at least one embodiment of the present disclosure.
Figure 28:
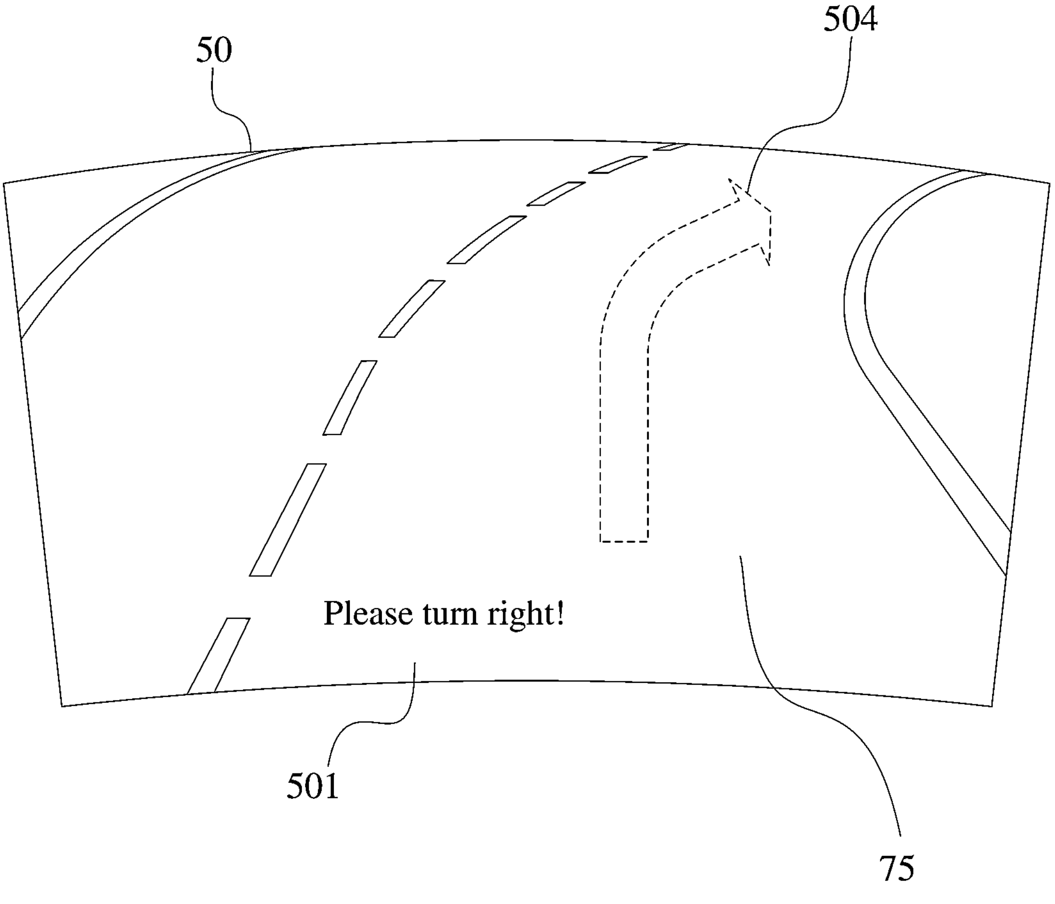
FIG. 28 shows a schematic diagram of a reflective imaging part displaying a picture when there is deviation from a lane according to at least one embodiment of the present disclosure.
Figure 29:
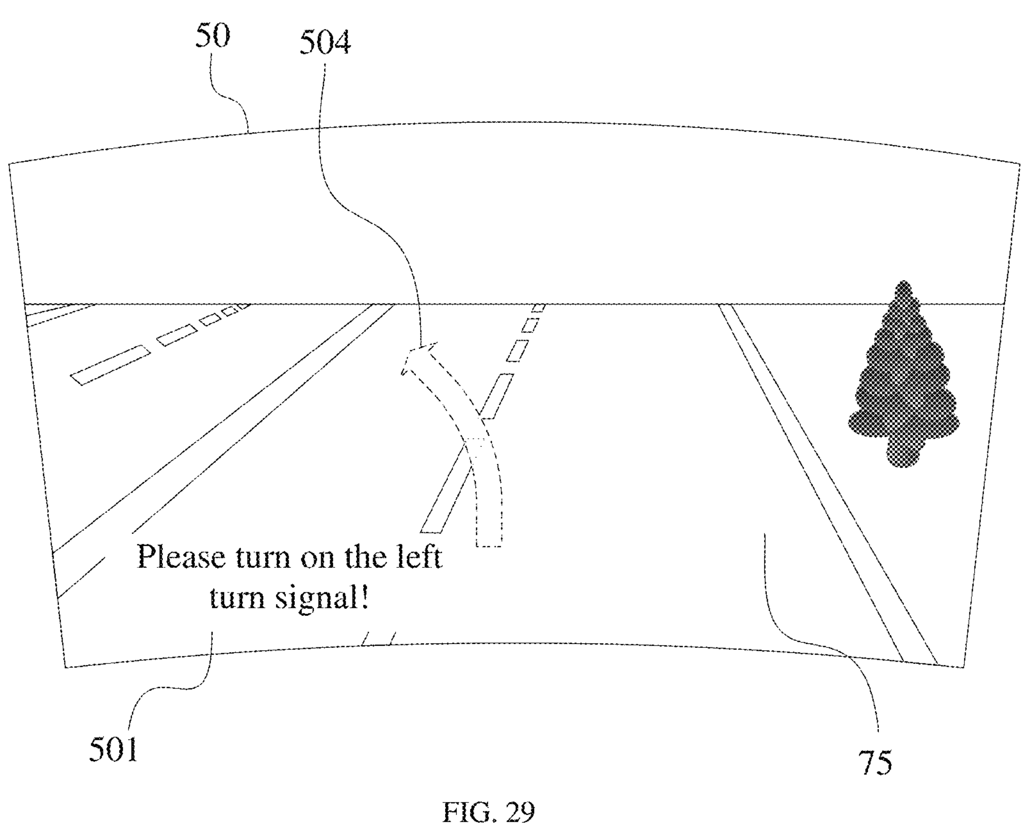
FIG. 29 shows another schematic diagram of a reflective imaging part displaying a picture when there is deviation from a lane according to at least one embodiment of the present disclosure.

For example, there are two situations in which the vehicle is in the normal state; if the deviation parameter is not greater than the corresponding deviation threshold, it indicates that the vehicle is running normally without deviation, and simple target information may be determined, for example, a text "Lane keeping", etc. is displayed. If the deviation parameter is greater than the corresponding deviation threshold, but it belongs to the above-described normal state, it indicates that although the vehicle is currently deviating from the lane, but it is turning normally, etc. and the corresponding target information may be displayed in a prompt mode. For example, the head up display system displays images corresponding to a current lane and a turn lane in the AR mode, for example, projects a blue direction arrow pointing to the turn lane, projects a blue virtual road that fits the current road and projects a green lane that fits the turn lane; or, it may project a brief map of the road, including the current lane and the turn lane, which may be distinguished by specific colors and shapes. For example, if the driver is currently about to exit the expressway, and is turning to the right ramp, images of the main lane and the ramp with an arrow pointing to the ramp may be projected on the reflective imaging part 50; in a case that the driver changes lanes and overtakes, images of the current lane and the overtake lane are projected on the reflective imaging part 50, and a lane change trajectory of the vehicle may be prompted by flashing. As shown in FIG. 27 and FIG. 28, the head up display system may determine that the current driving lane 75 is a right-turn lane according to lane position information corresponding to the current driving lane 75; if the vehicle continues to go straight, a deviation angle of the vehicle may increase, in this case, an early warning text 501, for example, "Please turn right", may be displayed on the reflective imaging part 50, and meanwhile, an arrow 504 fitted to the current driving lane 75 may be displayed, so as to intuitively prompt the driver to turn right. Or, as shown in FIG. 29, if the driver is currently changing to a left lane, a direction corresponding to the deviation angle of the vehicle is left; if the driver does not currently turn on the left turn signal, the driver may currently change lanes against regulations, and a warning text 501 "Please turn on the left turn signal" may be displayed on the reflecting apparatus 50 to prompt the driver to turn on the left turn signal; in addition, an arrow 504 may also be used to indicate the current driving direction of the vehicle to prompt the driver that the vehicle is deviating to the left.

For example, in a process of vehicle running, regardless of whether the vehicle is in an early warning state or a normal state, the priority driving lane may be displayed in real time. For example, the processor 100 is configured to determine the priority driving lane of the vehicle according to the lane position information and the vehicle position information, take the priority driving lane as the target object; determine a projection position to project the target object on the reflective imaging part 50, take the projection position or the edge of the projection position as the target position, and control the target imaging device to display pre-set target information at the target position.

Or, a boundary line of the lane may also be displayed in real time; for example, the processor 100 is configured to determine the priority driving lane of the vehicle according to the vehicle position information and the lane position information, take boundary lines on both sides of the priority driving lane as the target object, take a graphic whose shape matches the boundary lines as target information; determine a projection position to project the target object on the reflective imaging part 50, take the projection position as the target position, and control the target imaging device to display target information in a pre-set color at the target position.

In the embodiments of the present disclosure, the priority driving lane of the vehicle may be determined in real time, the projection position of the priority driving lane projected on the reflective imaging part 50 may be determined based on a position of the priority driving lane or positions of the boundary lines on both sides of the priority driving lane, and then the target position may be determined. Because a distance between the entire lane and the vehicle is gradually increasing, the priority driving lane cannot be treated as a point; a plurality of points may be selected from the priority driving lane as sampling points, so that the head up display system can more accurately determine at which positions of the reflective imaging part 50 the content that fits the priority driving lane is displayed. For example, because distances between different points on the priority driving lane and the vehicle are different, a portion of the priority driving lane may be displayed respectively by using a plurality of imaging devices, for example, the first single-layer imaging device 11 and the second single-layer imaging device 12 respectively display a portion of the priority driving lane; or, a point on the priority driving lane is taken as a reference point (e.g., a middle point is taken as the reference point), and a current distance between the reference point and the vehicle is taken as the target distance, to further determine one target imaging device.

For example, in different states, the priority driving lane may be displayed in different display modes. For example, in a normal state, the priority driving lane is displayed in green; in a case that the vehicle deviates, the priority driving lane may be displayed in red. For example, a graphic or an arrow, etc., which visually fits the priority driving lane, may be displayed, to guide the driver to drive. Or, in a normal state, a shape that fits the boundary lines is displayed in green on the reflective imaging part 50; in the case that the vehicle deviates, the boundary lines on left and right sides of the priority driving lane are displayed in red to prompt the driver to change lanes.

On the basis of the above-described embodiments, the processor may be further configured to, in a case that the deviation parameter is greater than the corresponding deviation threshold, and a difference between the deviation parameter and the deviation threshold is greater than a pre-set deviation difference value and/or a duration of the deviation state exceeds a pre-set safety deviation duration, generate a brake signal or a deceleration signal, and output the brake signal or the deceleration signal, for example, to a driving system of the vehicle.

In the embodiments of the present disclosure, if the deviation parameter of the vehicle is greater than the corresponding deviation threshold, there may be a risk of deviation currently; in addition, if a difference between the deviation parameter and the deviation threshold is greater than a pre-set deviation difference, or a duration of the deviation state exceeds a pre-set safety deviation duration, it may indicate that a current degree of deviation of the vehicle is too great, or the vehicle is running under a condition of deviation for a long time, in this case, a risk factor is high, and the processor 100 may generate a brake signal or a deceleration signal, and send the brake signal or the deceleration signal to the driving system of the vehicle, so that the vehicle can be decelerated or braked, to avoid a traffic accident caused by serious deviation of the vehicle.

On the basis of the above-described embodiments, the head up display system may also prompt the driver of abnormal roads. For example, the information collecting device 200 may include an image collecting device, a radar (e.g., an on-board radar), etc., for collecting road abnormality information; or, road abnormality information may also be acquired based on other external systems (e.g., a real-time traffic system, etc.); and the road abnormality information includes one or more selected from the group consisting of obstacle position, maintenance section position, dangerous section position, uneven section position, accident section position, and temporarily-inspected section position. When acquiring the road abnormality information, the processor 100 may take the road abnormality information as the target information. Or, the processor 100 is configured to determine, according to the road abnormality information, the projection position where an abnormal position is projected to the reflective imaging part 50, take the projection position or the edge of the projection position as the target position, and control the target imaging device to display the target information corresponding to the road abnormality information at the target position.

In the embodiments of the present disclosure, if there is a situation of road abnormality in the vicinity of the vehicle, the corresponding road abnormality information may be acquired based on the information collecting device 200 or other systems, and the processor 100 may directly display the road abnormality information as the target information on the reflective imaging part 50, for example, the target information is "Traffic accident 100 meters ahead", etc.; or, a position of the abnormal road may also be marked on the reflective imaging part 50 in a mode of AR display. For example, if the information collecting device detects that there is an obstacle (e.g., a stone, an ice surface, a pothole, etc.) on the road surface, a position of the obstacle, for example, an abnormal position, may be determined, a projection position at which the abnormal position is projected to the reflective imaging part 50 may be taken as the target position, and further the corresponding target information (e.g., a graphic matching a shape of the obstacle, etc.) may be displayed at the target position, so that the position of the obstacle may be displayed to the driver intuitively, so as to prompt the driver more effectively.

For example, in rainy, foggy, or nighttime environments with low visibility, the head up display system may also prompt the driver. For example, the surrounding information further includes current visibility; in a case that the current visibility is less than a pre-set visibility threshold, it indicates that the current visibility is low and a driving environment is harsh; the information collecting device 200 includes components such as an on-board radar, a distance sensor, etc. which may detect external objects normally even in an environment with low visibility, and position information of the external object may be collected based on the information collecting device 200; thereafter, the processor 100 is configured to take the position information of the external object as target information; or, the processor 100 is configured to determine a projection position at which the external object is projected to the reflective imaging part 50, take the projection position or the edge of the projection position as the target position, and control the target imaging device to display pre-set target information at the target position.

In the embodiments of the present disclosure, the position information of the external object includes the position of the external object and the distance between the external object and the vehicle (e.g., the motor vehicle); when detecting the external object, the head up display system may display the position information of the external object; or, the position of the external object is more intuitively marked in the AR mode, so as to notify the driver of the azimuth of the external object to avoid collision. For example, the road may also be taken as an external object, and a position of the road may be determined according to real-time road conditions and networked road information, so that auxiliary display for a driving route may be performed on the reflective imaging part 50, for example, an auxiliary line and a turn sign, etc. may be marked on a correct driving road.

For example, abnormal roads and external objects in environments with low visibility may all be marked as key objects, which may be determined as an early warning state, or, may be sub-divided into a normal state and an early warning state, etc., for example, may be divided based on the distance from the vehicle, if the abnormal road or the external object is far away from the vehicle, it may be a normal state; and if the distance is close, it may be an early warning state. Target information in different states may be displayed in corresponding display modes.

Those skilled in the art can understand that, the target information in the above-described plurality of embodiments refers to a content that can be currently displayed on the reflective imaging part 50; and at the same time point, a plurality of items of target information may be displayed on the reflective imaging part 50. For example, if an external object currently exists, one external object may correspond to at least one item of target information. Or, what corresponds to the early warning state and the normal state determined by the above-described embodiments may also be a state of one item of target information, that is, at the same time, states corresponding to different items of target information may be different. For example, if the vehicle is a motor vehicle, and there are two pedestrians A and B in front of the vehicle, the pedestrian A is closer to the vehicle, while the pedestrian B is farther away from the vehicle; with respect to the pedestrian A, it may be determined as an early warning state, for example, the pedestrian A may be marked with a red frame on the reflective imaging part 50 (e.g., on the windshield of the vehicle); with respect to the pedestrian B, it may be determined as a normal state, the pedestrian B may be marked with a green frame on the reflective imaging part 50; and the pedestrian A and the pedestrian B may be respectively marked with a red frame and a green frame on the reflective imaging part 50, without affecting with each other.

For example, in some embodiments, the processor 100 is further configured to: generate push information according to the target information, and send the push information to a server or to other device within a pre-set distance, for example, a vehicle, a mobile phone, a laptop, etc. In the embodiments of the present disclosure, the vehicle on which the head up display system is installed may share the collected information with other vehicles, for example, the collected information may be sent directly to other devices in the vicinity, or may also be uploaded to the server, and sent by the server to a device that needs the information. For example, in a case that the head up display system takes the position information of external objects, the position information of key objects, and road abnormality information, etc. as the target information, the target information may be shared with other devices; or, in a case that the local vehicle deviates from the lane, it may also notify other vehicles in the vicinity, and prompt other vehicles to avoid, and so on.

Figure 1B:
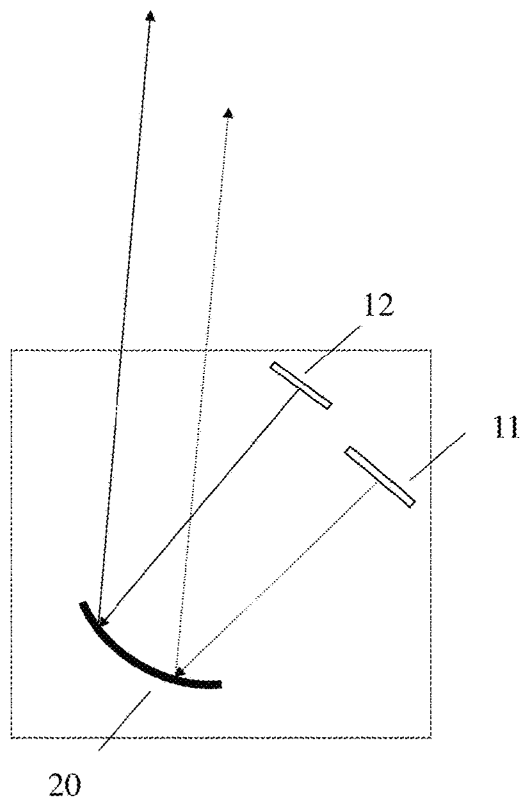
FIG. 1B shows a first structural schematic diagram of imaging by an imaging device group in a head up display system provided by at least one embodiment of the present disclosure.

At least one embodiment of the present disclosure further provides a head up display system; referring to FIG. 1, the head up display system includes an imaging device group and a concave reflective element 20; the imaging device group includes a plurality of single-layer imaging devices; and FIG. 1 shows the first single-layer imaging device 11 and the second single-layer imaging device 12.

Each single-layer imaging device is configured to emit imaging light incident to the concave reflective element 20; at least part of the plurality of single-layer imaging devices correspond to the same object distance or at least part of the plurality of single-layer imaging devices correspond to different object distances; an object distance includes a propagation path length of imaging light from a corresponding single-layer imaging device to the concave reflective element. For example, object distances corresponding to different single-layer imaging devices are different from each other, the object distance is the propagation path length of the imaging light from the corresponding single-layer imaging device to the concave reflective element or a distance from the single-layer imaging device to the concave reflective element; the concave reflective element 20 is configured to reflect the imaging light, for example, to the reflective imaging part, so that the reflective imaging part is capable of reflecting the imaging light to a pre-set range, for example, an eyebox range or eyebox ranges. The reflective imaging part is, for example, a windshield, etc. of an automobile.

For example, in some embodiments, referring to FIG. 2, the head up display system further includes a directional imaging device 30; as shown in FIG. 3, the directional imaging device 30 includes a light source device, a direction control element 32, a diffusing element 33 and a light modulating layer 34. The light source device includes at least one light source 31.

The direction control element 32 is configured to converge light emitted by the light source device, for example, to a pre-set region; and the pre-set region is a position or a range within a pre-set range (e.g., the eyebox range or eyebox ranges). The diffusing element 33 and the light modulating layer 34 may be arranged on the same side of the direction control element 32. The diffusing element 33 is configured to diffuse the converged light that is emergent from the direction control element 32, so that the converged light forms a light beam for forming a light spot. The light modulating layer 34 is configured to modulate the light beam for forming the light spot, so that the light beam forms directional imaging light. For example, the light modulating layer 34 is configured to block or transmit light, and emit the directional imaging light towards the reflective imaging part during transmitting, so that the reflective imaging part is capable of reflecting the directional imaging light to a pre-set range. For example, the light modulating layer 34 includes a liquid crystal layer (e.g., a liquid crystal display panel) or an electrowetting display layer; and the modulating layer may convert light passing therethrough into light (e.g., imaging light) including image information.

For example, in some embodiments, referring to FIG. 7, the head up display system may further include a first transflective element 21; the first transflective element 21 is capable of transmitting light having a first characteristic and reflecting light having a second characteristic; the imaging device group includes a first single-layer imaging device 11 capable of emitting first imaging light and a second single-layer imaging device 12 capable of emitting second imaging light; for example, the first single-layer imaging device 11 may be arranged on one side of the first transflective element 21, the second single-layer imaging device 12 and the concave reflective element 20 may be arranged on the other side of the first transflective element 21; the above-described "one side" and "the other side" are opposite sides. The first imaging light has the first characteristic, and the second imaging light has the second characteristic. Therefore, the first transflective element can transmit the first imaging light and reflect the second imaging light.

For example, in some embodiments, referring to FIG. 8 and FIG. 9, the head up display system further includes a second transflective element 22; the imaging device group further includes a third single-layer imaging device 13 capable of emitting third imaging light; and the third imaging light has a third characteristic. For example, the third object distance corresponding to the third single-layer imaging device 13 is different from the first object distance and the second object distance; and the third object distance is a propagation path length of the third imaging light from the third single-layer imaging device 13 to the concave reflective element 20 or a distance from the third single-layer imaging device 13 to the concave reflective element 20.

For example, the second transflective element 22 is capable of transmitting light having the first characteristic and reflecting light having a third characteristic; the first transflective element 21 is further capable of transmitting light having the third characteristic; referring to FIG. 8, the second transflective element 22 may be arranged between the first single-layer imaging device 11 and the first transflective element 21; and the third single-layer imaging device 13 and the first transflective element 21 may be arranged on the same side of the second transflective element 22; or, the second transflective element 22 is capable of transmitting light having the second characteristic and reflecting light having the third characteristic; the first transflective element is further capable of reflecting light having the third characteristic; referring to FIG. 9, the second transflective element 22 may be arranged between the second single-layer imaging device 12 and the first transflective element 21; and the third single-layer imaging device 13 and the first transflective element 21 may be arranged on the same side of the second transflective element 22.

For example, in some embodiments, the head up display system further includes one or more plane reflective elements; referring to FIG. 10, in a case that the head up display system includes one plane reflective element 23, the plane reflective element 23 is configured to reflect imaging light emitted by at least one single-layer imaging device in the imaging device group to the concave reflective element 20; or, in a case that the head up display system includes a plurality of plane reflective elements 23 and the at least one single-layer imaging device includes a plurality of single-layer imaging devices, the plurality of plane reflective elements 23 are configured to reflect imaging light emitted by the plurality of single-layer imaging devices to the concave reflective elements. For example, in some embodiments, the plurality of plane reflective element (plane reflective mirrors) 23 are in one-to-one correspondence with the plurality of single-layer imaging devices; each plane reflective mirror 23 is used to reflect imaging light emitted by a corresponding single-layer imaging device to the concave reflective element (curved surface mirror) 20; or two plane reflective element (plane reflective mirrors) may also correspondingly reflect imaging light emitted by three single-layer imaging devices, etc.; and correspondence between the plurality of plane reflective element and the plurality of single-layer imaging devices is not limited in the embodiments of the present disclosure.

For example, an area of the directional imaging region on the reflective imaging part is greater than an area of the magnified imaging region on the reflective imaging part; the directional imaging region is a region where the directional imaging light can be incident to a surface of the reflective imaging part; and the magnified imaging region is a region where the imaging light emitted by the imaging device group can be incident to the surface of the reflective imaging part.

At least one embodiment of the present disclosure further provides a control method of a head up display system; the head up display system includes a imaging device group and a directional imaging device; the imaging device group includes at least one single-layer imaging device, and an imaging range of the directional imaging device is greater than an imaging range of at least one single-layer imaging device; the control method includes: determining to-be-displayed target information and a target imaging device, and controlling the target imaging device to display the target information; for example, the target imaging device is a imaging device selected from a group consisting of the directional imaging device and the at least one single-layer imaging device in the imaging device group.

For example, the head up display system may be any one of the head up display systems provided by the embodiments of the present disclosure; and the control method may also implement various functions and execute various operations of the processor in the above-described head up display system; the above-described embodiments may be specifically referred to for details, and no details will be repeated here.

At least one embodiment of the present disclosure further provides a vehicle, for example, a motor vehicle, a ship, or an airplane; the vehicle includes any one of the head up display systems provided by the embodiments of the present disclosure, so that a user (e.g., a driver) can use the head up display system to operate the vehicle more safely and conveniently.

The following several statements should be noted:

(1) The accompanying drawings involve only the structure(s) in connection with the embodiment(s) of the present disclosure, and other structure(s) can be referred to common design(s).

(2) For clarity, in accompanying drawings for illustrating the embodiment(s) of the present disclosure, the thickness of a layer or a structure may be enlarged or reduced, that is, the drawings are not drawn to the actual scale.

(3) In case of no conflict, embodiments of the present disclosure and the features in the embodiments may be mutually combined to obtain new embodiments.

The above descriptions are only specific embodiments of the present disclosure, but the protection scope of the present disclosure is not limited thereto, the protection scope of the present disclosure should be determined by the protection scope of the claims.

The invention claimed is:

1. A head up display system, comprising: an imaging device group, a concave reflective element, a directional imaging device and a processor, wherein the imaging device group comprises at least one single-layer imaging device; the directional imaging device comprises a light source device, a direction control element, a diffusing element and a light modulating layer; the processor is respectively connected with the directional imaging device and the at least one single-layer imaging device in the imaging device group;

the direction control element is configured to converge light emitted by the light source device; the diffusing element is configured to diffuse converged light that is emergent from the direction control element, so that the converged light forms a light beam for forming a light spot; and the light modulating layer is configured to modulate the light beam for forming the light spot, so that the light beam is formed into directional imaging light;

the at least one single-layer imaging device is configured to emit imaging light incident to the concave reflective element;

the concave reflective element is configured to reflect the imaging light; and the processor is configured to: determine to-be-displayed target information and a target imaging device, and control the target imaging device to display the to-be-displayed target information; wherein the target imaging device is one or more imaging devices selected from a group consisting of the directional imaging device and the at least one single-layer imaging device in the imaging device group;

wherein the direction control element comprises at least one light converging element; the at least one light converging element is between the light source device and the diffusing element, and the at least one light converging element is configured to converge light emitted by different light sources comprised in the light source device; or wherein the direction control element comprises at least one light converging element and at least one collimating element; the at least one light converging element is between the light source device and the diffusing element, and the at least one light converging element is configured to converge light emitted by different light sources comprised in the light source device; the collimating element among the at least one collimating element is configured to adjust an exit direction of light emitted by the light source corresponding to the collimating element to a pre-set angle range, and emit adjusted light to the diffusing element through the at least one light converging element.

2. The head up display system according to claim 1, further comprising a reflective imaging part, wherein the reflective imaging part is configured to reflect the directional imaging light and the imaging light to an eyebox range or eyebox ranges of the head up display system;

the directional imaging light is reflected by the reflective imaging part to a pre-set range within the eyebox range or eyebox ranges;

the imaging light is reflected by the reflective imaging part to the pre-set range or to a range, which is outside the pre-set range and within the eyebox range or eyebox ranges.

3. The head up display system according to claim 2, wherein the reflective imaging part comprises a directional imaging region and a magnified imaging region, and an area of the directional imaging region is larger than an area of the magnified imaging region;

the directional imaging region is a region, where the directional imaging light is capable of being incident to, of a surface of the reflective imaging part; and the magnified imaging region is a region, where the imaging light emitted by a single single-layer imaging device in the imaging device group is capable of being incident to, of the surface of the reflective imaging part.

4. The head up display system according to claim 2, wherein the concave reflective element is not in an optical path of the light emitted from the light source device to the reflective imaging part.

5. The head up display system according to claim 1, wherein the at least one single-layer imaging device comprises a plurality of single-layer imaging devices; and at least part of the plurality of single-layer imaging devices correspond to a same object distance or at least part of the plurality of single-layer imaging devices correspond to different object distances; and the object distance comprises a propagation path length of the imaging light from the single-layer imaging device corresponding to the object distance to the concave reflective element.

6. The head up display system according to claim 1, further comprising one or more plane reflective elements;

wherein in a case that the head up display system comprises one plane reflective element, the plane reflective element is configured to reflect the imaging light emitted by the at least one single-layer imaging device in the imaging device group to the concave reflective element; or in a case that the head up display system comprises a plurality of plane reflective elements and the at least one single-layer imaging device comprises a plurality of single-layer imaging devices, the plurality of plane reflective elements are configured to reflect imaging light emitted by the plurality of single-layer imaging devices to the concave reflective element.

7. The head up display system according to claim 1, wherein the direction control element further comprises a reflective element;

the reflective element comprises a light cup;

the light cup comprises a housing having an inner reflective surface; an end of the light cup away from an opening of the light cup is configured to arrange the light source corresponding to the light cup; or the light cup comprises a light cup with solid center, the light cup with solid center comprises a transparent part with solid center, and an end portion of the light cup with solid center away from a light exit opening of the light cup with solid center is configured to arrange the light source corresponding to the light cup with solid center, so that total reflection occurs in a case that at least part of the light emitted by the light source is incident to the surface of the light cup with solid center.

8. The head up display system according to claim 7, wherein the light cup with solid center is provided with a cavity at the end portion, and a surface of the cavity close to the light exit opening of the light cup with solid center is a convex surface protruding toward the end portion; or the light cup with solid center is provided with a hole at the light exit opening, and a bottom surface of the hole is a convex surface protruding toward the light exit opening; or wherein, the at least one collimating element comprises a plurality of collimating elements, the collimating element among the plurality of collimating elements is inside the light cup, a size of the collimating element is smaller than or equal to a size of the opening of the light cup; and the collimating element is configured to collimate part of light emitted by the light source in the light cup.

9. The head up display system according to claim 1, further comprising a reflective imaging part, wherein the reflective imaging part is configured to reflect the directional imaging light and the imaging light to an eyebox range or eyebox ranges of the head up display system;

the directional imaging light is reflected by the reflective imaging part to a pre-set range within the eye box range or eye box ranges;

the imaging light is reflected by the reflective imaging part to the pre-set region or a range, which is outside the pre-set range and within the eyebox range or eyebox ranges;

the processor is further configured to:

determine a target position, whereat the target position is a position of the reflective imaging part for displaying the to-be-displayed target information;

determine a target imaging device according to the target position; and control the target imaging device to display the to-be-displayed target information at the target position; and/or wherein, the head up display system further comprises an information collecting device; the information collecting device is connected with the processor;

the information collecting device is configured to collect local information and surrounding information, and send the local information and the surrounding information which are collected to the processor;

the processor is further configured to: acquire the local information and the surrounding information, and generate target information according to the local information and the surrounding information.

10. The head up display system according to claim 9, wherein the processor is further configured to:

in a case that a projection position of an external object projected to the reflective imaging part is located within the magnified imaging region, take the external object as the target object, and determine a target distance between a reference object and the target object; wherein the magnified imaging region is a region, where the imaging light emitted by a single imaging device in the imaging device group is capable of being incident to, of a surface of the reflective imaging part;

take the projection position or an edge of the projection position located within the magnified imaging region as the target position; and select the target imaging device from the imaging device group according to the target distance;

or wherein the processor is further configured to:

in a case that a projection position of an external object projected to the reflective imaging part is located within the directional imaging region, take the external object as the target object, wherein the directional imaging region is a region, where directional imaging light emitted by the directional imaging device is capable of being incident to, of the surface of the reflective imaging part; and take the projection position or an edge of the projection position as the target position.

11. The head up display system according to claim 9, wherein the local information comprises local speed information; the surrounding information comprises a distance between a reference object and an external object; and the generating the target information according to the local information and the surrounding information by the processor comprises:

determining a safety distance according to the local speed information, and judging whether the distance between the reference object and the external object is greater than the safety distance;

in a case that the distance between the reference object and the external object is not greater than the safety distance, determining that the reference object is currently in an early warning state, and taking corresponding first early warning information as the target information, wherein the first early warning information comprises one or more selected from a group consisting of a first early warning image and a first early warning video; or wherein, the surrounding information comprises a distance between a reference object and an external object and a position of the external object; and the generating the target information according to the local information and the surrounding information by the processor comprises:

taking the distance between the reference object and the external object and the position of the external object as the target information; or determining a projection position where the external object is projected to the reflective imaging part, taking the projection position or an edge of the projection position as the target position, and controlling the target imaging device to display preset target information at the target position; or wherein, the surrounding information comprises lane position information; the local information comprises vehicle position information; and the generating the target information according to the local information and the surrounding information comprises:

according to the lane position information and the vehicle position information, determining a deviation parameter indicating that a vehicle deviates from a current driving lane, and judging whether the deviation parameter is greater than a corresponding deviation threshold; wherein the deviation parameter comprises a deviation angle and/or a deviation distance;

in a case that the deviation parameter is greater than the corresponding deviation threshold, determining to be currently in an early warning state, and taking corresponding third early warning information as the target information; wherein the third early warning information comprises one or more selected from a group consisting of a third early warning image, a third early warning video, and a priority driving lane; or wherein, the surrounding information comprises front information, and the front information comprises a vehicle speed of a front vehicle and/or a current distance to a front vehicle;

the processor is further configured to take a projection position where a target region of the front vehicle is projected to the reflective imaging part as the target position, take the front information as the target information, and control the target imaging device to display the target information at the target position; wherein the target region of the front vehicle is a blank region between rear wheels of the front vehicle or a region where a trunk is located; or wherein, the surrounding information comprises road abnormality information; the road abnormality information comprises one or more selected from a group consisting of obstacle position, uneven section position, dangerous section position, maintenance section position, accident section position, and temporarily-inspected section position; and the processor is further configured to:

take the road abnormality information as the target information; or determine an abnormal position according to the road abnormality information, determine a projection position where the abnormal position is projected to the reflective imaging part, take the projection position or an edge of the projection position as the target position, and control the target imaging device to display the target information corresponding to the road abnormality information at the target position; or wherein, the surrounding information comprises current visibility; and the processor is further configured to:

in a case that the current visibility is less than a pre-set visibility threshold, acquire position information of an external object collected by the information collecting device;

take the position information of the external object as target information; or determine a projection position where the external object is projected to the reflective imaging part, take the projection position or an edge of the projection position as the target position, and control the target imaging device to display preset target information at the target position; or wherein, the processor is further configured to:

generate push information according to the target information, and send the push information to a server or to another device within a pre-set distance; or wherein, the information collecting device comprises one or more selected from a group consisting of an image collecting device, an on-board radar, an infrared sensor, a laser sensor, an ultrasonic sensor, a speed sensor, a rotational speed sensor, an angular velocity sensor, a global positioning system, an automobile information exchange system, and an advanced driving assistant system.

12. The head up display system according to claim 11, wherein the processor is further configured to:

in a case that the external object is a key object, determine the reference object to be currently in an early warning state, and take corresponding second early warning information as the target information, wherein the second early warning information comprises one or more selected from a group consisting of a second early warning image and a second early warning video.

13. The head up display system according to claim 11, wherein the local information further comprises vehicle state information; the vehicle state information comprises one or more selected from a group consisting of a vehicle speed, a vehicle acceleration, and a turn signal state; and the generating the target information according to the local information and the surrounding information by the processor further comprises:

in a case that the deviation parameter is greater than the corresponding deviation threshold and an early warning condition is satisfied, determining to be currently in an early warning state;

wherein the early warning condition comprises one or more selected from a group consisting of items that: the vehicle speed being greater than a first pre-set speed value, the vehicle acceleration being not greater than zero, a turn signal on an opposite side to a direction corresponding to the deviation angle of the vehicle being not in an ON state, a current state being an unchangeable lane state, and a duration of lane deviation being greater than a pre-set first deviation duration threshold; or wherein, the processor is further configured to:

determine a priority driving lane of the vehicle according to the lane position information and the vehicle position information, take the priority driving lane as the target object; determine a projection position where the target object is projected to the reflective imaging part, take the projection position or an edge of the projection position as the target position, and control the target imaging device to display pre-set target information at the target position; or determine the priority driving lane of the vehicle according to the vehicle position information and the lane position information, take boundary lines on both sides of the priority driving lane as the target object, take a graphic whose shape matches the boundary lines as target information; determine a projection position to project the target object on the reflective imaging part, take the projection position as the target position, and control the target imaging device to display target information in a pre-set color at the target position; or wherein, the processor is further configured to:

in a case that the deviation parameter is greater than the corresponding deviation threshold, and a difference between the deviation parameter and the deviation threshold is greater than a pre-set deviation difference value and/or a duration of being in the deviation state exceeds a pre-set safety deviation duration, generate a brake signal or a deceleration signal, and output the brake signal or the deceleration signal.

14. The head up display system according to claim 11, wherein the processor is further configured to:

in a case that the reference object is currently in an early warning state, control the target imaging device to display the target information in a normal mode or a first highlighting display mode; wherein the first highlighting display mode comprises one or more selected from a group consisting of dynamic display, highlighting display, and display in a first color; and in a case that the reference object is currently in a normal state, control the target imaging device to display the target information in a normal mode or a second highlighting display mode; wherein the second highlighting display mode comprises display in a second color.

15. A control method of the head up display system according to claim 1, wherein the head up display system comprises an imaging device group and a directional imaging device; the imaging device group comprises at least one single-layer imaging device, and an imaging range of the directional imaging device is greater than an imaging range of the at least one single-layer imaging device;

the control method comprises: determining to-be-displayed target information and a target imaging device, and controlling the target imaging device to display the target information; wherein the target imaging device is an imaging device selected from a group consisting of the directional imaging device and the at least one single-layer imaging device in the imaging device group.

16. A vehicle, comprising the head up display system according to claim 1.

17. A head up display system, comprising: an imaging device group, a concave reflective element, a directional imaging device and a processor, wherein the imaging device group comprises at least one single-layer imaging device; the directional imaging device comprises a light source device, a direction control element, a diffusing element and a light modulating layer; the processor is respectively connected with the directional imaging device and the at least one single-layer imaging device in the imaging device group;

the direction control element is configured to converge light emitted by the light source device; the diffusing element is configured to diffuse converged light that is emergent from the direction control element, so that the converged light forms a light beam for forming a light spot; and the light modulating layer is configured to modulate the light beam for forming the light spot, so that the light beam is formed into directional imaging light;

the at least one single-layer imaging device is configured to emit imaging light incident to the concave reflective element;

the concave reflective element is configured to reflect the imaging light; and the processor is configured to: determine to-be-displayed target information and a target imaging device, and control the target imaging device to display the to-be-displayed target information; wherein the target imaging device is one or more imaging devices selected from a group consisting of the directional imaging device and the at least one single-layer imaging device in the imaging device group;

wherein the head up display system further comprises a first transflective element, the first transflective element is capable of transmitting light having a first characteristic and reflecting light having a second characteristic;

the imaging device group comprises a first single-layer imaging device capable of emitting first imaging light and a second single-layer imaging device capable of emitting second imaging light; the first imaging light has the first characteristic, and the second imaging light has the second characteristic;

the first transflective element is configured to transmit the first imaging light and reflect the second imaging light; or wherein, the head up display system further comprises a first transflective element and a second transflective element, the first transflective element is capable of transmitting light having a first characteristic and reflecting light having a second characteristic; the imaging device group comprises a first single-layer imaging device capable of emitting first imaging light and a second single-layer imaging device capable of emitting second imaging light; the first imaging light has the first characteristic, and the second imaging light has the second characteristic;

the first transflective element is configured to transmit the first imaging light and reflect the second imaging light; the imaging device group further comprises a third single-layer imaging device capable of emitting third imaging light; the third imaging light has a third characteristic;

the second transflective element is configured to transmit the first imaging light having the first characteristic and reflect the third imaging light having the third characteristic; the first transflective element is further configured to transmit the third imaging light having the third characteristic imaging light; or the second transflective element is configured to transmit the second imaging light having the second characteristic and reflect the third imaging light having the third characteristic; the first transflective element is further configured to reflect the third imaging light having the third characteristic.

18. A head up display system, comprising: an imaging device group, a concave reflective element, a directional imaging device and a processor, wherein the imaging device group comprises at least one single-layer imaging device; the directional imaging device comprises a light source device, a direction control element, a diffusing element and a light modulating layer; the processor is respectively connected with the directional imaging device and the at least one single-layer imaging device in the imaging device group;

the direction control element is configured to converge light emitted by the light source device; the diffusing element is configured to diffuse converged light that is emergent from the direction control element, so that the converged light forms a light beam for forming a light spot; and the light modulating layer is configured to modulate the light beam for forming the light spot, so that the light beam is formed into directional imaging light;

the at least one single-layer imaging device is configured to emit imaging light incident to the concave reflective element;

the concave reflective element is configured to reflect the imaging light; and the processor is configured to: determine to-be-displayed target information and a target imaging device, and control the target imaging device to display the to-be-displayed target information; wherein the target imaging device is one or more imaging devices selected from a group consisting of the directional imaging device and the at least one single-layer imaging device in the imaging device group;

wherein the direction control element comprises at least one transparent part, the transparent part comprises a light incident surface and a light exit surface, the light source device comprises a plurality of light sources, and light emitted by a light source corresponding to the transparent part enters the transparent part from the light incident surface and exits from the light exit surface, the transparent part is configured to make a divergence angle of the light emitted from the light exit surface smaller than a divergence angle of the light incident to the light incident surface;

the light incident surface comprises a first light incident sub-surface with a protrusion direction towards the light source, and/or the light exit surface comprises a first light exit sub-surface with a protrusion direction away from the light source;

the light incident surface further comprises a second light incident sub-surface connected with the first light incident sub-surface, and the transparent part further comprises a side surface connecting the second light incident sub-surface with the light exit surface, part of the light emitted by the light source enters the transparent part from the second light incident sub-surface, then is reflected by the side surface, and exits from the light exit surface; and/or the light exit surface further comprises a second light exit sub-surface connected with the first light exit sub-surface, and the transparent part further comprises a side surface connecting the second light exit sub-surface with the light incident surface, part of the light emitted by the light source enters the transparent part, then is reflected by the side surface, and is emitted from the second light exit sub-surface;

wherein, and/or, the at least one transparent part is in a transparent part layer, the plurality of light sources are in a light source layer, and a region between the light source layer and the transparent part layer is a gas medium layer;

wherein, and/or, the direction control element further comprises a plurality of light converging elements, light emitted by a light source corresponding to the light converging element passes through the transparent part after passing through the light converging element, the at least one transparent part is in a transparent part layer, the plurality of light converging elements are in a light converging layer, and a region between the light converging element layer and the transparent part layer is a gas medium layer.

* * * * *